(12) United States Patent
Hildreth

(10) Patent No.: US 8,726,194 B2
(45) Date of Patent: May 13, 2014

(54) ITEM SELECTION USING ENHANCED CONTROL

(75) Inventor: Evan Hildreth, Ottawa (CA)

(73) Assignee: QUALCOMM Incorporated, San Diego, CA (US)

( * ) Notice: Subject to any disclaimer, the term of this patent is extended or adjusted under 35 U.S.C. 154(b) by 515 days.

(21) Appl. No.: 12/102,587

(22) Filed: Apr. 14, 2008

(65) Prior Publication Data

US 2009/0031240 A1    Jan. 29, 2009

Related U.S. Application Data

(60) Provisional application No. 60/952,448, filed on Jul. 27, 2007.

(51) Int. Cl.
G06F 3/048    (2013.01)

(52) U.S. Cl.
USPC ............ 715/859; 715/772; 715/823; 715/835

(58) Field of Classification Search
USPC .................................. 715/859, 772, 823, 835
See application file for complete search history.

(56) References Cited

U.S. PATENT DOCUMENTS

| | | | | |
|---|---|---|---|---|
| 5,565,888 | A * | 10/1996 | Selker | 715/823 |
| 5,594,469 | A * | 1/1997 | Freeman et al. | 345/158 |
| 5,745,165 | A | 4/1998 | Atsuta et al. | |
| 6,130,677 | A | 10/2000 | Kunz | |
| 6,160,899 | A | 12/2000 | Lee et al. | |
| 6,272,231 | B1 * | 8/2001 | Maurer et al. | 382/103 |
| 6,301,370 | B1 | 10/2001 | Steffens et al. | |
| 6,545,663 | B1 | 4/2003 | Arbter et al. | |
| 6,690,354 | B2 | 2/2004 | Sze | |
| 6,775,014 | B2 | 8/2004 | Foote et al. | |
| 6,827,579 | B2 | 12/2004 | Burdea et al. | |
| 6,920,942 | B2 * | 7/2005 | Koederitz | 175/25 |
| 7,429,988 | B2 * | 9/2008 | Gonsalves et al. | 345/472 |
| 7,598,942 | B2 * | 10/2009 | Underkoffler et al. | 345/158 |
| 2002/0041327 | A1 | 4/2002 | Hildreth et al. | |
| 2002/0064149 | A1 | 5/2002 | Elliott et al. | |
| 2003/0227439 | A1 | 12/2003 | Lee et al. | |

(Continued)

FOREIGN PATENT DOCUMENTS

| | | | |
|---|---|---|---|
| JP | 2000194469 A | 7/2000 | |
| JP | 2001312743 A | 11/2001 | |

(Continued)

OTHER PUBLICATIONS

Fussell et al. 'Gestures Over Video Streams to Support Remote Collaboration on Physical Tasks'. In: Human-Computer Interaction, vol. 19, p. 273-309. Published Sep. 2004. [retrieved on Nov. 12, 2008]. Retrieved from the Internet: <URL:http://www.cs.cmu.edu/~sfussell/pubs/Manuscripts/Fussell_Gestures_HC1_2004.pdf>.

(Continued)

*Primary Examiner* — Amy Ng
*Assistant Examiner* — Meseker Takele
(74) *Attorney, Agent, or Firm* — Kilpatrick Townsend & Stockton LLP

(57) ABSTRACT

An enhanced control, in which a guide line is defined relative to an object in a user interface, items aligned with the guide line are displayed without obscuring the object. A selected item is output based on receiving a selection of one of the displayed items.

15 Claims, 23 Drawing Sheets

(56) References Cited

U.S. PATENT DOCUMENTS

| | | |
|---|---|---|
| 2004/0047461 A1 | 3/2004 | Weisman et al. |
| 2005/0059488 A1 | 3/2005 | Larsen et al. |
| 2005/0080849 A1 | 4/2005 | Wee et al. |
| 2005/0239028 A1 | 10/2005 | Wu et al. |
| 2006/0010400 A1 | 1/2006 | Dehlin et al. |
| 2006/0101016 A1 | 5/2006 | Uehara |
| 2006/0202953 A1 | 9/2006 | Pryor et al. |
| 2007/0009139 A1 | 1/2007 | Landschaft et al. |
| 2007/0118820 A1 | 5/2007 | Hatakeyama |
| 2008/0089587 A1 | 4/2008 | Kim et al. |
| 2009/0027337 A1 | 1/2009 | Hildreth |
| 2010/0235786 A1 | 9/2010 | Maizels et al. |

FOREIGN PATENT DOCUMENTS

| | | |
|---|---|---|
| JP | 2002116859 A | 4/2002 |
| JP | 2004258714 A | 9/2004 |
| JP | 2004343653 A | 12/2004 |
| JP | 2007047900 A | 2/2007 |
| JP | 2008516322 A | 5/2008 |
| WO | 2006037786 A2 | 4/2006 |

OTHER PUBLICATIONS

International Search Report and Written Opinion—PCT/US2008/071224, International Search Authority—European Patent Office—Oct. 22, 2008.

Mammen J P., et al., "Simultaneous Tracking of Bothe Hands by Estimation of Erroneous Observations", SPANN Lab, Department of Electrical Engg., Indian Institute of Technology, Bombay, Powai, Mumbai-400076, India, sc@ee.iitb.ac.in, 2001, pp. 83-92.

McCormick., et al., "A Probabilistic Exclusion Principle for Tracking Multiple Objects", Copyright 2000, Kluwer Academic Publishers, http://www.robots.ox.ac, uk.-vdg, pp. 57-71.

European Supplementary Search Report for European Application No. 08834565.7 mailed Oct. 28, 2010, 3 pages.

Communication pursuant to Article 94(3) EPC for European Application No. 08834565.7, mailed Dec. 2, 2010, 6 pages.

* cited by examiner

ITEM SELECTION USING ENHANCED CONTROL

CROSS REFERENCE TO RELATED APPLICATIONS

This application claims the benefit of U.S. Patent Application No. 60/952,448, filed Jul. 27, 2007, which is incorporated herein by reference.

BACKGROUND

1. Field

The present disclosure generally relates to a user interface and, according to one particular implementation, a control or widget.

2. Description of the Related Art

With regard to user interfaces, a control (or widget) is an interface element that a computer user interacts with, such as a window or a text box. In some cases, a control (such as a virtual button) may have a similar function and appearance to a physical counterpart of that control.

SUMMARY

The enhanced control described herein may be used to facilitate the selection of an item from amongst a group of items, such as the selection of a letter from amongst a group of letters that make up an alphabet, or the selection of a function from amongst a number of functions. By orienting or aligning these items along a guide line, they may be displayed so as to not overlap, block, or otherwise obscure a portion of an object also displayed within the user interface, to allow for intuitive selection of the items by a user.

Selection may occur by hovering a cursor over the item for a set period of time, or by selecting a physical control such as a mouse button or keyboard key while the cursor is positioned over the item, or through any another approach. Selection or potential selection of the item may cause the item to change its appearance (i.e. to be 'activated' or 'highlighted'), thereby distinguishing items from one another along the guide line and reducing selection errors. The object that provides the basis for the definition or positioning of the guide line may itself interact with the items, such as where movement of an input device or other user input is mapped to an arm motion of an avatar surrounded by the items aligned along the guide line.

According to one general implementation, a computer-implemented process includes defining a guide line relative to an object in a user interface, and displaying items aligned with the guide line without obscuring the object. The process also includes outputting a selected item based on receiving a selection of one of the displayed items.

Implementations may include one or more of the following features. For instance, the selection may be a cursor-based user selection. A position of the object in the user interface may be determined, where the guide line may be dynamically defined to surround at least a portion of the determined position. A second object may be detected in the user interface, where the guide line may be dynamically defined on a side of the object opposite to the second object. A change in the determined position may be detected, and the guide line may be redefined relative to the object based on the determined change.

In further examples, the guide line may be a straight, curved, circular, polygonal, or zigzag shaped guide line, where each item may be an alphanumeric character, a symbol, a setting, or a name. Outputting the selected item may further include highlighting the selected item, such as by changing a color, opacity or size of the selected item. Changing the color, opacity or size of the selected item may further include changing the color, opacity or size of the selected item to a first degree, and changing the color, opacity or size of items adjacent to the selected item to a second degree. Displaying the items may further include evenly distributing the items along the guide line. The object may be a blank region in the user interface, or an avatar. A starting point and an ending point of the guide line may be aligned horizontally or vertically.

In additional examples, defining the guide line may further include determining a range of motion of a control portion of the avatar, and defining the guide line within the range of motion of the control portion, where the guide line may be defined along an outer edge of the range of motion of the control portion. A first or a second potential control portion of the avatar may be designated as a control portion, the designated control portion may be animated, and the control portion designation may be swapped from the first potential control portion to the second potential control portion, or from the second potential control portion to the first potential control portion.

According to a further general implementation, a computer program product is tangibly embodied in a machine-readable medium. The computer program product includes instructions that, when read by a machine, operate to cause data processing apparatus to define a guide line relative to an object in a user interface, to display, without obscuring the object, items aligned with the guide line, and to output, based on receiving a selection of one of the displayed items, the selected item.

According to an additional general implementation, a device includes a processor and a user interface. The processor defines a guide line relative to an object in a user interface. The user interface displays, without obscuring the object, items aligned with the guide line, and outputs, based on receiving a selection of one of the displayed items, the selected item.

This brief summary has been provided to enable a quick understanding of various concepts and implementations described by this document. A more complete understanding can be obtained by reference to the following detailed description in connection with the attached drawings. It is to be understood that other implementations may be utilized and changes may be made.

DETAILED DESCRIPTION

Figure 1:
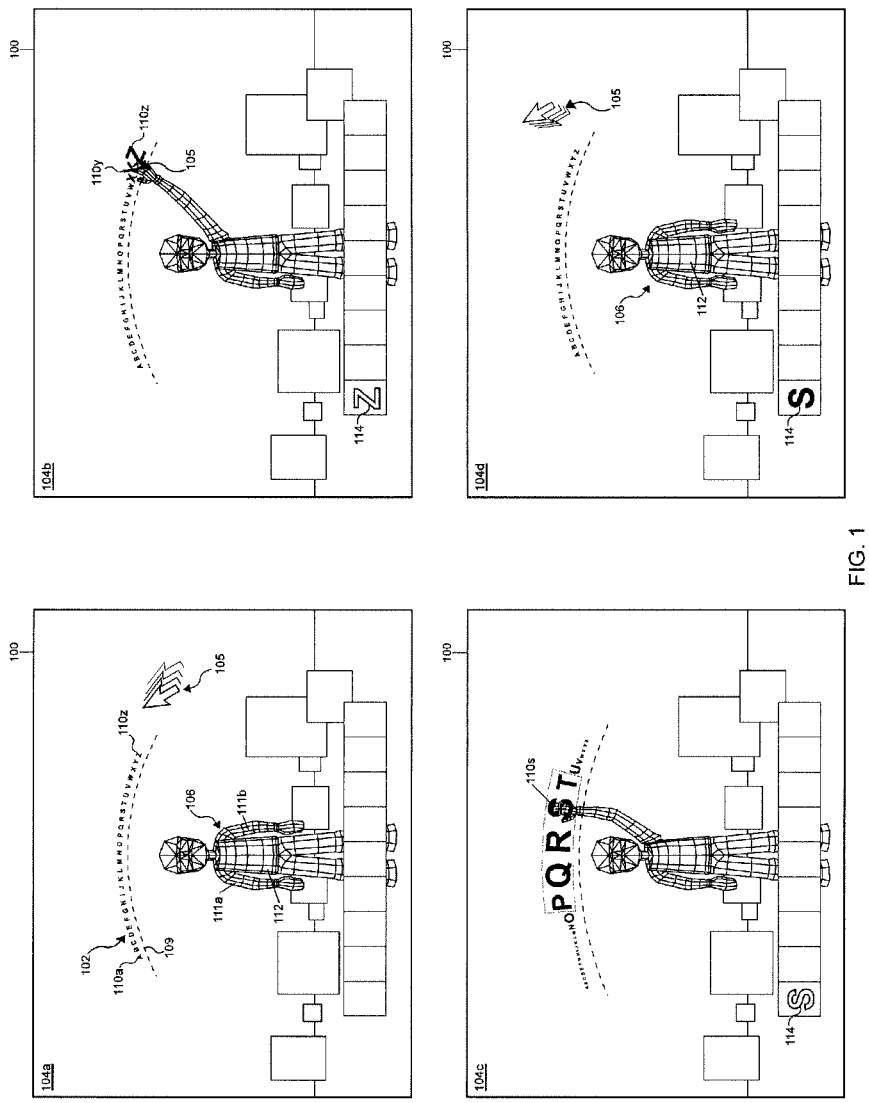
FIG. 1 is a conceptual diagram of a user interface that uses an exemplary enhanced control.

FIG. 1 is a conceptual diagram of a user interface 100 using an exemplary enhanced control 102, shown in states 104a to 104d. In state 104a, a cursor 105 travels leftwards from the right side of a user interface 100 that includes (among other things) an avatar 106 and the control 102 disposed above the avatar 106. The control 102 includes a guide line 109 (shown in state 104a as a dashed line), and items 110a to 110z, which each represent a letter of the English alphabet. Although the items 110a to 110z are illustrated as representing letters, they may also represent other things, such as icons, functions, images, objects, symbols, applications, characters, or groups or clusters of like or dissimilar items.

In state 104a, since the cursor 105 is outside of the range of motion of the avatar 106, the avatar 106 is depicted in a neutral or relaxed position, with the arms 111a and 111b of the avatar 106 relaxed alongside the torso 112 of the avatar 106.

The avatar 106 may have a human-like appearance, and may be able to navigate within a virtual world. Examples of avatars include the playable characters in video games like WORLD OF WARCRAFT® by BLIZZARD ENTERTAINMENT and virtual worlds such as SECOND LIFE® by LINDEN RESEARCH, INC®. A cursor, such as a mouse cursor, may be mapped to a control portion of the object, such as a hand of the avatar, mirroring or mimicking movements of a cursor with movements of the avatar An 'item' is intended to refer to any unit or element that a user may desire to select from a set of units or elements, including but not limited to units or elements that are similar or dissimilar to the item. The set may include as few as no items, or as many as hundreds, thousands or millions of items. In one straightforward example, an item is an alphabetic character, and the set of items includes the twenty six letters in the English alphabet, or fifty two case sensitive letters. Similarly, the set could be made up of or include symbol characters, such as the symbols !, @, #, $, %, ^, &, (,), {, }, <, >, :, ;, ', ", ?, /, ~, ', or other symbols that are not typically accessible via a keyboard or keypad selection. Other sets could include names, such as personal names or place names, selectable from a list of names, icons, functions, or settings, such as media settings (e.g. 'Play,' 'Volume Up,' 'Power Off,' 'Record Series,' etc.).

In this regard, items may include the numbers (0 through 9); letters (e.g. letters A through Z of an English alphabet, or kana characters from Japanese script); text symbols (e.g., space " ", hyphen "–", period "."); predefined or dynamically determined text phrases (e.g., ".com", ".org", "FAQ", "Main Menu", "Send", "Accept Call", "Play DVD", "Power Off", etc.); names; titles; times; dates; operations, events, processes, or functions (e.g., "Save Game", "Load Game", "Start Application", "Transmit Data", "Media Player", "Photo Viewer", "Paint Brush", "Email", "Map"); configuration options (e.g., "640×480 resolution mode", "800×600 resolution mode", "Expert Mode", "Novice Mode", "Training Mode", "Cheat Mode"); or any other information or combination of information.

State 104b occurs when the cursor 105, now illustrated as a plus symbol, travels over a region of the user interface 100 occupied by item 110z, and is thus in a mouseover condition with the control 102. Upon detecting the mouseover condition, the arm 111b of the avatar 106 is animated to appear as if the avatar 106 is pointing at or grabbing the item 110z. Furthermore, the item 110z becomes highlighted when its size is increased, as does adjacent item 110y to a lesser extent. The mouseover condition over the item 110z also causes the item 110z to be output, such as by displaying the item 110z in output region 114, or by using a text-to-speech converter to pronounce item 110z using a speaker. The mouseover condition may thus place an associated item in a pre-selected, activated or highlighted state, although the pre-selection or highlighting of an item does not strictly require the item to change its appearance.

The user interface 100 transitions to state 104c when the cursor 105 continues to travel along the general path defined by the guide line 109, until the cursor hovers over item 110s of the control 102. The arm 111b of the avatar 106 is animated, and follows the movement of the cursor 105. As the cursor 105 approaches items or crosses the guide line 109, the approached items become highlighted by increasing size, and as the cursor 105 travels away from a highlighted item, the item reduces size. When a physical control on the input device is selected (e.g., when an onClick event occurs), the activated item 110s associated with the mouseover condition is output.

In state 104d, the item 110s has been selected. The cursor 105 is traveling away from the control 102, whose items have all returned to their original, non-highlighted condition. Furthermore, the arm 111b of the avatar 106 has returned to its original, relaxed position adjacent to the torso 112. The selected item 110s is output, for example in the output region 114.

As shown in the various states, the enhanced control may be used to facilitate the selection of a letter or letters from amongst a group of letters that make up an alphabet. By orienting or aligning these items along the guide line, they are displayed so as to not overlap, block, or otherwise obscure the avatar or other object, to thereby allow for intuitive selection of the items by a user.

Although the selection of a letter in state 104c has been described as occurring via a mousedown event, selection may also occur by hovering the cursor 105 over the letter for a predetermined period of time, or by selecting a keyboard key while a tabbed cursor is positioned over the letter. Selection (or potential selection) of the letter may cause the item to become highlighted, thereby distinguishing letters from one another along the guide line. An avatar or other object that is used for defining the position of the guide line may itself interact with the items, as in the case where movement of the cursor 105 is mapped to motion of the arm 111b the avatar 106.

Figure 2:
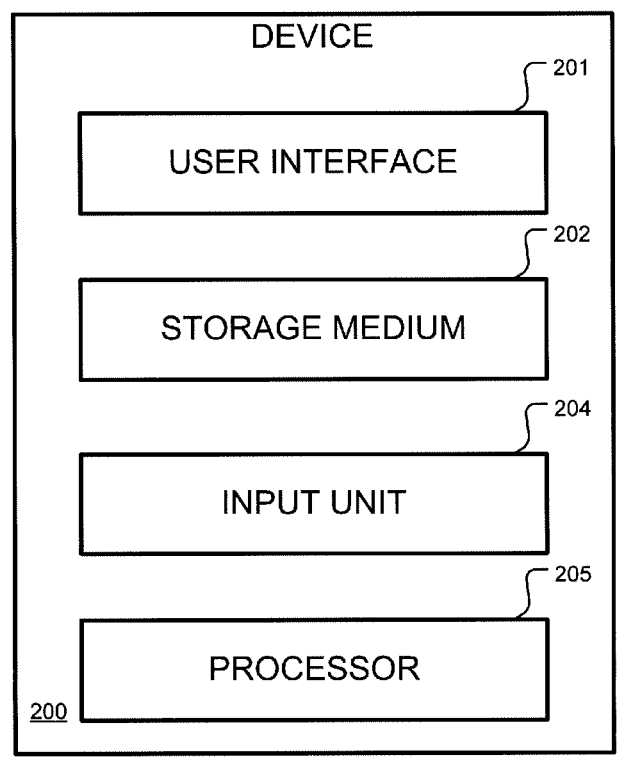
FIG. 2 is a block diagram of a device used to implement an exemplary enhanced control.

FIG. 2 is a block diagram of a device 200 used to implement an exemplary enhanced control. Briefly, the device 200 includes, among other things, a user interface 201, a storage medium 202, an input unit 204, and a processor 205.

The user interface 201 is a mechanism for allowing a user to interact with the device, or with applications invoked by the device. The user interface 201 may effect both input and output, allowing a user to manipulate the device or for the device to produce the effects of the user's manipulation. The device 200 may utilize any type of user interface 201, such as a graphical user interface (GUI), a voice user interface, or a tactile or haptic user interface.

The user interface 201 may be configured to render a visual display image. For example, the user interface 201 may be a monitor, a television, a liquid crystal display (LCD), a plasma display device, a projector with a projector screen, an auto-stereoscopic display, a cathode ray tube (CRT) display, a digital light processing (DLP) display, or any other type of display device configured to render a display image. The user interface 201 may include one or more display devices. In some configurations, the user interface 201 may be configured to display images associated with an application, such as display images generated by an application, including an object such as an avatar.

The storage medium 202 stores and records information or data, and may be an optical storage medium, magnetic storage medium, flash memory, or any other storage medium type. The input unit 204 is a hardware mechanism that transforms physical inputs into commands that may be used by the device, such as a keyboard or keypad, mouse, trackball, touchpad, or joystick. In certain implementations, such as where the device 201 uses a touch screen, the functionality of the user interface 201 and the input unit 204 may be combined into a single, combined module or unit.

The input unit 204 may be a device used to capture images, either as still photographs or a sequence of moving images. The input unit 204 may use the light of the visible spectrum or with other portions of the electromagnetic spectrum, such as infrared. For example, the input unit 204 may be a digital camera, a digital video camera, or any other type of device configured to capture images. The input unit 204 may include one or more cameras. In some examples, the input unit 204 may be configured to capture images of an object or user interacting with an application. For example, the input unit 204 may be configured to capture images of a user or person physically gesticulating in free-space, or otherwise interacting with an application within the field of view of the input unit 204.

The input unit 204 may be a stereo camera, a time-of-flight camera, or any other camera. For instance the input unit 204 may be an image detector capable of sampling a background image in order to detect motions and, similarly, gestures of a user. The input unit 204 may produce a grayscale image, color image, or a distance image, such as a stereo camera or time-of-flight camera capable of generating a distance image. A stereo camera may include two image sensors that acquire images at slightly different viewpoints, where a processor compares the images acquired from different viewpoints to calculate the distance of parts of the images. A time-of-flight camera may include an emitter that generates a pulse of light, which may be infrared light, where the time the pulse of light travels from the emitter to an object and back to a sensor is measured to calculate the distance of parts of the images.

The device 200 is electrically connected, over a wireline or wireless pathway, to the input unit 204 and the user interface 201, and is configured to control the operation of the processor 205 to provide for the enhanced control. In one configuration, the device 200 uses the processor 205 or other control circuitry to execute an application that provides for the enhanced control. Specifically, the device 200 receive inputs from the input unit 204 and processes the received inputs to calculate the position of the enhanced control in relation to an object in the user interface 201, and to position a cursor, avatar, or other representation of the user in the user interface 201.

In one example implementation, input occurs by using a camera to detect images of a user performing gestures. For instance, a mobile phone can be placed on a table and may be operable to generate images of a user using a face-forward camera. Alternatively, the gesture may be recognized or detected using the input device 204, such as by detecting a "tilt left" gesture to move a representation left and to select an item disposed on the left side of a control, or by detecting a "tilt forward and right" gesture to move a representation up and to the right of a neutral position, to select an item disposed on an upper right side of a control.

The input device 204 may thus be any type of module operable to detect an angular position of the device 200, such as a gyroscope, accelerometer, or a camera-based optical flow tracker. In this regard, image-based input may be supplemented with or replaced by tilt-sensor input to perform functions or commands desired by a user. Put another way, detection of a user's gesture may occur without using a camera. By moving the device in the same kind of stroke pattern that is visualized on the control on the user interface, the user is enabled to control the same interface or application in a straightforward manner.

Although the device 200 has been described as a personal computer (PC), such a description is made merely for the sake of brevity, and other implementations or manifestations are also contemplated. For instance, the device 200 may be implemented as a set top box, a television, an ultra-mobile personal computer (UMPC), a mobile internet device (MID), a digital picture frame (DPF), a portable media player (PMP), a general-purpose computer (e.g., a desktop computer, a workstation, or a laptop computer), a server, a gaming device or console, or any other type of electronic device that includes a processor or other control circuitry configured to execute instructions, or any other apparatus that includes a user interface.

Figure 3:
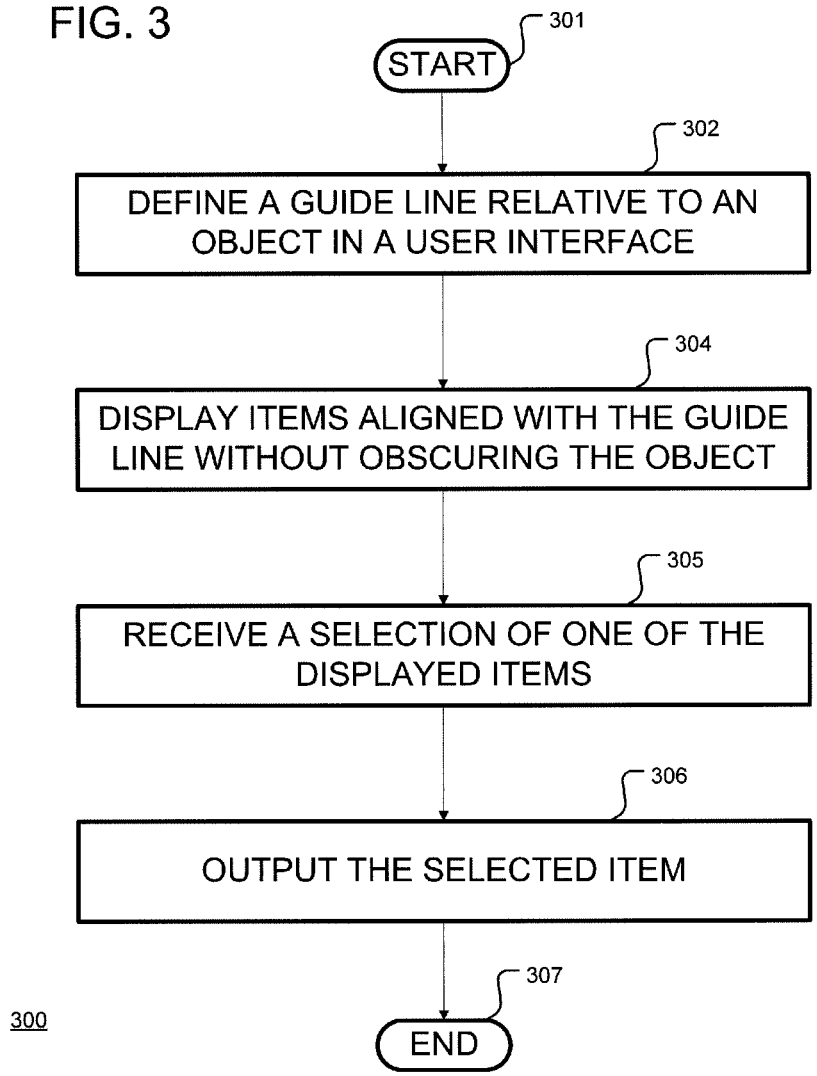
FIG. 3 is a flowchart of a process that involves the use of an exemplary enhanced control.

FIG. 3 is a flowchart of a process 300 that involves the use of an enhanced control. Briefly, the process 300 includes defining a guide line relative to an object in a user interface, and displaying items aligned with the guide line without obscuring the object. The process 300 also includes outputting a selected item based on receiving a selection of one of the displayed items.

In more detail, when the process 300 begins (S301), a guide line is defined relative to an object in a user interface. The process 300 may begin when the user manually indicates that the enhanced control should be displayed, or the process 300 may begin automatically when it is determined that an item are items are to be input, such as where a user advances to a text input field. Since, by increasing the size of highlighted items, the enhanced control may be used to display more items along the guide line that would ordinary fit within the user interface if all of the items had equal dimensions, the process 300 may also begin after a determination is made that all the items cannot be displayed effectively within the user interface without using the enhanced control. In doing so, the enhanced control provides for the display of a subset of the items at a sufficient or effective size to permit easy and reliable user selection of a particular item.

Figure 4:
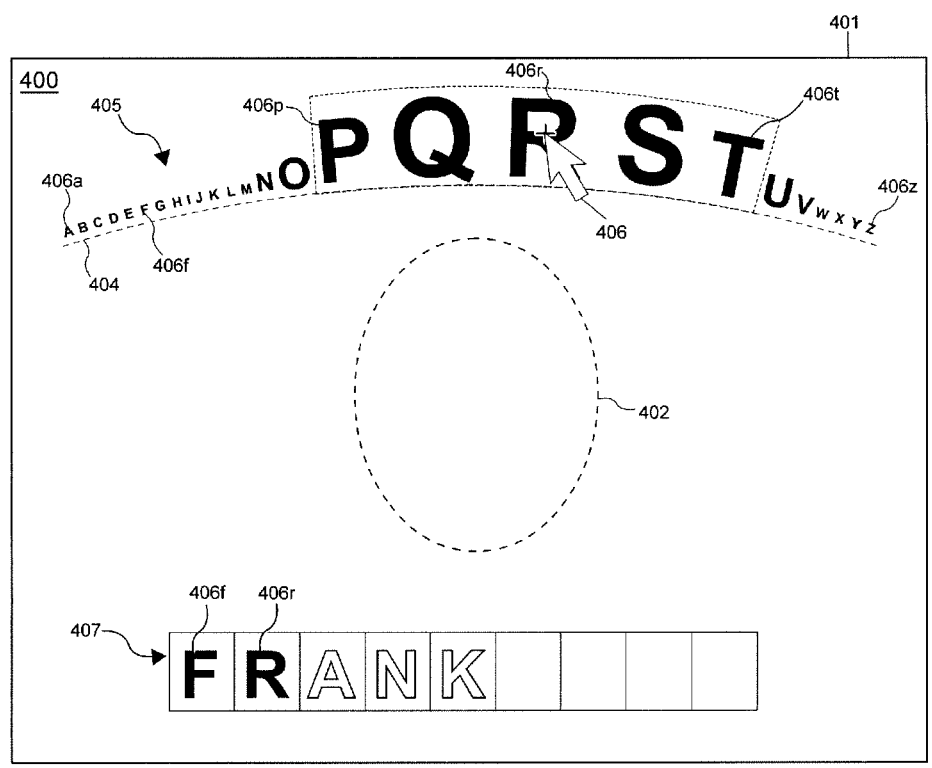
FIG. 4 illustrates a user interface that includes an object and an exemplary enhanced control that further includes a guide line.

Referring ahead briefly, FIG. 4 illustrates a user interface 401 that includes an object 402 (depicted as a dashed circle), and a control 405 that further includes a guide line 404. Although the guide line 404 is illustrated as a dashed line in FIG. 4, in other example implementations the guide line 404 is depicted as a solid line, or is not depicted at all.

The control 405 allows for the intuitive selection or output of items, such as letters 406, while at the same time allowing for the display of a portion or the entirety of the object 402 in a region adjacent to, near, partially or completely bounded or surrounded by, or otherwise defined by the guide line 404. When it is determined that the items are to be output or selected, such as when a user selects an input field that calls for the entry of text data, the control is positioned in a location in the user interface 401 that allows for the display of the items 406 and the object 402, and is thus defined relative to, in relation to, based on, or with regard to the object 402. Put another way, the position of the object 402 may represent an anchor position, in relation to which the guide line 404 and other elements of the control 405 may be oriented or aligned, or with respect to which the other elements may be positioned.

In order to determine this anchor position, the object by which the guide line 404 is to be defined, and the position of that object, are determined. In some cases, the object may be predetermined or predefined, such as where the control 405 is output in conjunction with or includes an avatar, knob, icon, list, table of data, graph of data, text entry field, another control or widget, or known blank region of the user interface 401. In other cases, the object is dynamically determined at the time when the control 405 is to be output, such as where the user tabs to a text field and the text field is used as the object, where a blank region of the user interface 401 is located based on the current state of the user interface 401, where a biggest, predominant, most or least colorful object on the screen is dynamically determined to be the object, or where an in-focus element, region or window is dynamically determined to be the object.

In these and other cases, the size, shape, position, boundaries or other contexts of the object 402 are detected, and the guide line 404 is defined in relationship to these detected contexts. For instance, the guide line 404 may be defined to have an overlapping or non-overlapping relationship with the object or a portion of the object, a bisecting relationship, a dividing relationship, a space constrained or limited relationship, or any other relationship, such as a relationship based on size, shape, proportion, or an anatomical model of the object 402.

In summary, and among other things, the user interface 401 includes an object 402, which may be a representation of the user, and items 406 that make up a set of items. The items 406 may be displayed in a dynamic fashion, such that the items 406 are displayed in a size and position that permits the user to conveniently and reliably select each item. Since it may otherwise not have been possible to fit each of the items 406 within the user interface 401 or aligned with the guide line 404 in a large size, a subset of the items 406 may be rendered in that larger size.

Figure 5:
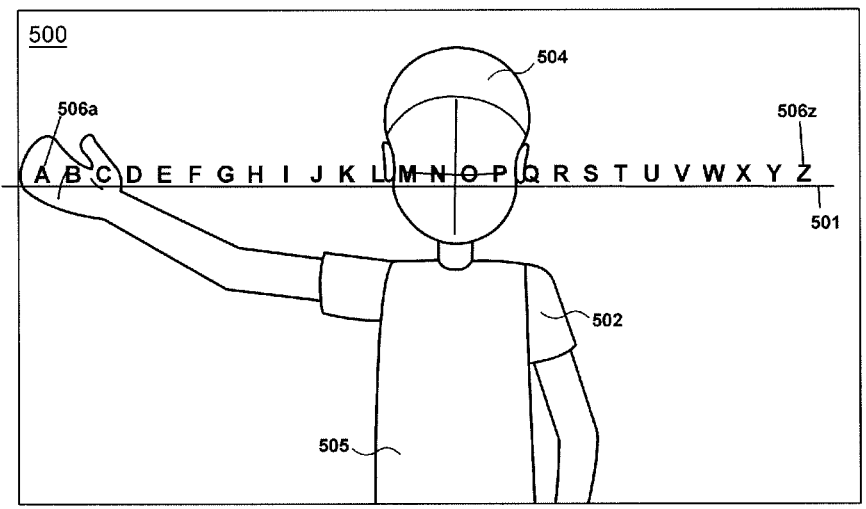
FIGS. 5 to 11 illustrate example guide line arrangements and example relationships between guide lines and objects.
Figure 6:
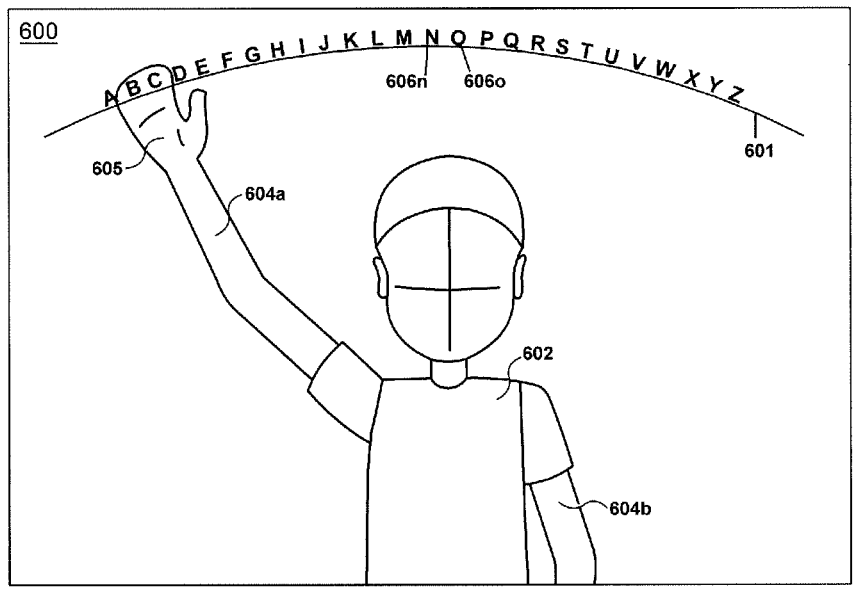

FIGS. 5 and 6 illustrate example guide line arrangements and example relationships between guide lines and objects. In FIG. 5, a guide line 501 is straight, and is defined to overlap an object 502, or to divide a top third of the object 502, or to separate a head 504 of the object from a torso 505 of the object 502. In FIG. 6, a guide line 601 is curved, and is defined to peak a certain pixel distance above the object 602, or to not obscure the object 602, or to be within a range of motion of the arms 604 (or other control portion) of the object 602.

The guide line may be defined with respect to the object so that items aligned with the guide line are within reach of the object. As illustrated in FIG. 6, the curved guide line 601 forms an arc shape, so that any individual item or subset of items can be reached by one of the extended arms 604 of the avatar 602. The radius of curvature of the curved guide line 601 may be determined based on the length of the arms 604 of the avatar 602, such that the position of the curved guide line 601 corresponds to a natural wave of one of the arms 604 when one of the arms 604 is in an extended, overhead position.

Although the guide line has been described as being below items, where a cursor moves above the guide line to select an item, other layouts and configurations are possible. For example, a guide line may be positioned above the selectable items or to a side of the selectable items, and may be horizontally, vertically or diagonally oriented.

In addition to the straight and curved guide lines illustrated in FIGS. 5 and 6, the guide line may take on a zigzag, circular, polygonal, or any other shape. A starting point and an ending point of the guide line may be aligned horizontally or vertically, or these points may not be in any type of alignment. A guide line may be circular and continuous, whereby a guide line has no defined starting or ending point (or the appearance of no starting or ending point), or where the starting point and ending point are coincident. The guide line may itself be a moving or animated object, such that items aligned along the guide line are constantly or intermittently moving or animated themselves.

Range of motion determinations may be made based upon complex anatomical models, such as a model that mimics the bio-kinetic restrictions or abilities of a human body and applies these abilities to an avatar. Simpler rules-of-thumb may also be used, such an approach that estimates that an avatar's arm may reach a distance equal to a dimension of the avatar's head multiplied by a multiplier. In any case, the particular positioning, orientation, alignment, or configuration of the guide lines are defined by some aspect of the object. As such, object 602 is said to be surrounded by the guide line 601.

Based on the position of the object, the guide line may be dynamically defined to surround a portion of the determined position. If the object, or a portion of the object, lies within a circle, and the guide line defines an arc that is any portion of that circle, then the guide line may be said to surround the object. As shown in FIG. 6, for example, if extended, the guide line 601 would form a circle that would surround a majority of the object 602, with the exception of a small region representing the fingers of the object 602, which would lie outside the circle.

Figure 7:
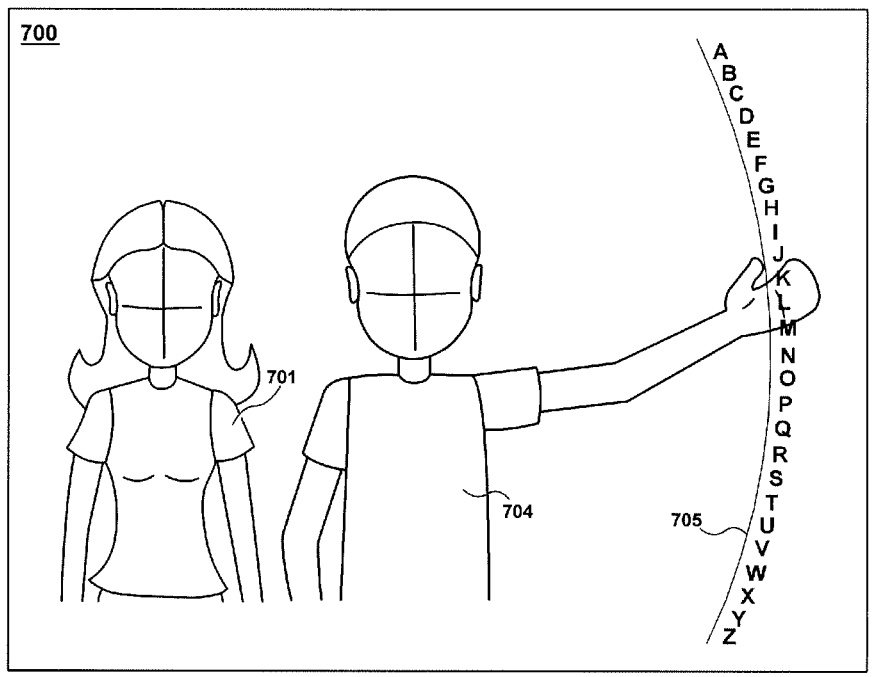

As the definition of the guide line may be dynamic, the guide-line may be redefined in real-time or in near-real-time, such that the user may perceive or observe the redefinition or relocation of the guide line. For instance, the guide line may initially be defined above the object, as shown in FIG. 6, upon detecting that no other objects are adjacent to the object. As shown in FIG. 7, if a second object 701 enters the user interface 702 on the left side of the controlling object 704, the guide line 705 may be redefined or otherwise repositioned to move away from the second object 701, or be dynamically defined on a side of the control object 704 opposite to the second object 701. Such a feature may advantageously allow the enhanced control to be more efficiently utilized in non-static user interfaces that have multiple moving objects.

Defining the guide line may further include determining a range of motion of a control portion of the avatar, and defining the guide line within the range of motion of the control portion, where the guide line may be defined along an outer edge of the range of motion of the control portion. For instance, the radius of curvature of the vertically oriented guide line 705 may be determined based on the length of the arm of the avatar, such that the position of the vertically oriented guide line 705 corresponds to a natural wave of the arm of the avatar when the arm is in an extended position to a side.

Figure 8:
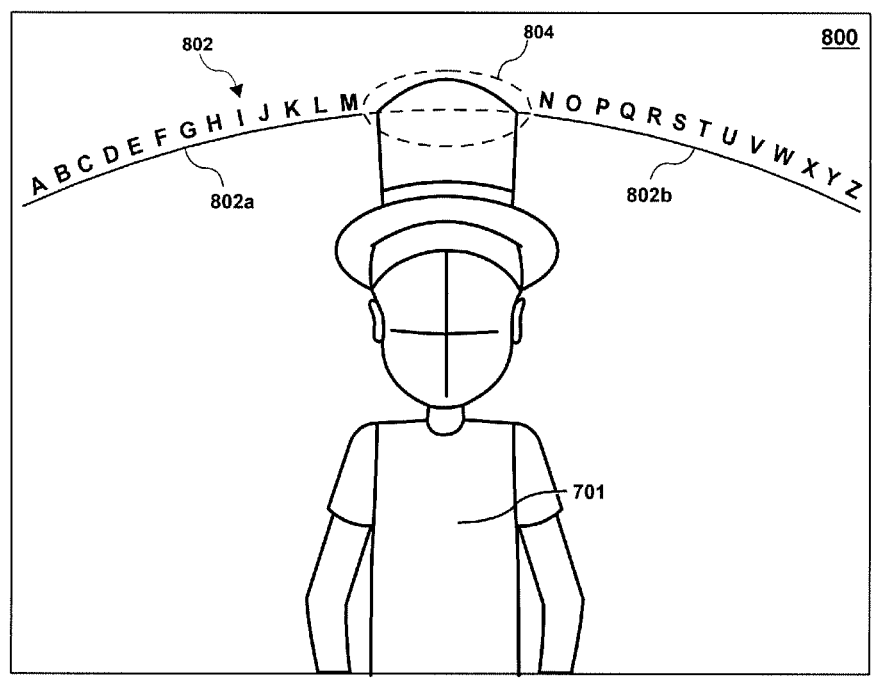

In an further example, such as where the number of items is too large to be associated with a single guide line, or where the user interface is crowded with other elements, each item may in fact represent multiple items or clusters of items, or the guide line may be divided into parts and my thus define discontinuous portions, or multiple guide lines may be defined. In FIG. 8, since the user interface 800 includes an object 801 that occupies nearly its entire vertical length, the guide line 802 is defined with a discontinuous portion or region 804 (illustrated as a dashed line), effectively dividing the guide line 802 into guide line portions 802a and 802b.

Figure 9:
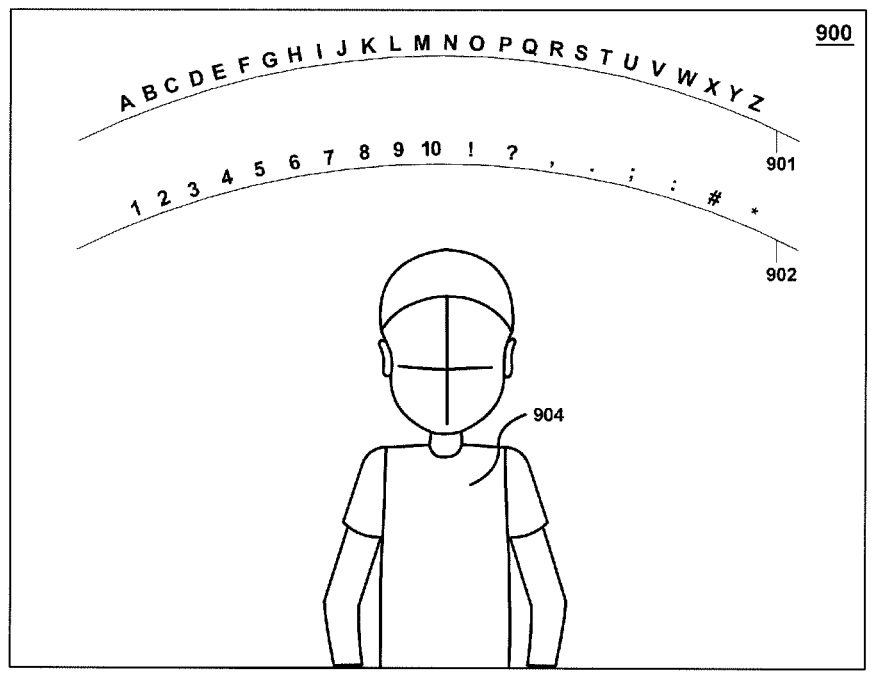

In FIG. 9, since the number of items to be selected or output is large and could possibly make display or selection of the items on a single guide line difficult or counter-intuitive, two guide lines 901 and 902 are defined within the user interface. Although guide lines 901 and 902 are illustrated as having the same general shape and being parallel, neither characteristic must apply. For instance, the guide line 901 may be a zigzag shaped guide line that is generally aligned vertically along the left side of the object 904, and the guide line 902 may be a hexagonal guide line that is defined to overlap a torso of the object 904 itself, or a circular guide line that completely surrounds the object 904 on all sides.

A selection of an item on a first guide line may spawn the definition of or display of items aligned with a second guide line, such as where the first guide line is used for the selection of an alphabetical character, where names (or other item types) that start with an alphabetical character displayed on the first guide line are displayed or otherwise output on the second guide line once the alphabetical character has been selected.

Instead of defining the guide line relative to the object, the guide line may also be defined or positioned based on the bounds of the user interface. For instance, a guide line may be defined to extend from one edge (or a point near one edge) of a user interface to an opposite edge (or a point near the opposite edge). The guide line may be defined or positioned based on the positions or other components of the user interface, for example, relative to a desktop icon, a user interface button, or an object within a virtual world. The guide line may be symmetrical or asymmetrical with regards to the boundaries of the user interface.

Returning to FIG. 3, items aligned with the guide line are displayed, with or without obscuring the object (S304). Items may be aligned with the guide line if a bottom, middle, right, left, center, or other portion of each item is on the guide line, or is disposed parallel to a point on the guide line that corresponds to the item. In FIG. 4, for example, items 406a and 406z are each in alignment with the guide line 404 since portions of the respective items are parallel to the guide line 404, even though the items 406a and 406z are not strictly in alignment with each other. When displayed, the aligned items 406 as a whole take on the general shape or look of the guide line 404 itself. FIG. 5 also illustrates items aligned with the guide line 501, although first item 506a and last item 506z are also generally in alignment with each other since the guide line 501 is straight.

Figure 10:
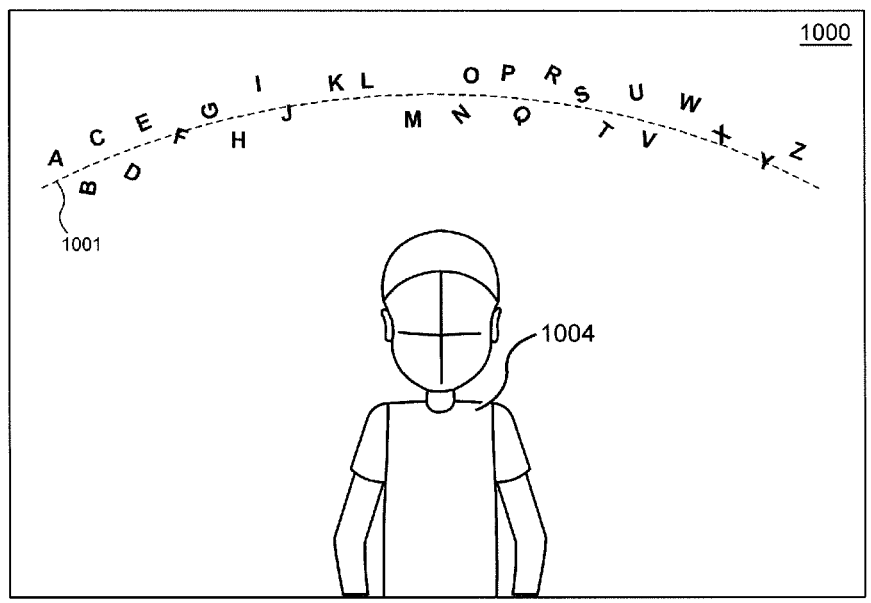

As shown in the user interface 1000 of FIG. 10, in the case where the center or other internal point of each item is aligned with the guide line 1001, each item may be rotated around its center to give the displayed items a less uniform, or more randomized look. This randomization may be further emphasized by offsetting the items above and below a guide line (or some other line parallel to the guide line), such that some items appear above the guide line and some items appear below the guide line, although the aggregated items are generally still aligned with, or take on the general look, feel, orientation, arrangement or disposition defined by the guide line.

The items may or may not be evenly distributed along the guide line. For instance, the items may initially be evenly distributed, and then unevenly redistributed when a cursor hovers over a particular item and that item is re-sized. Alternatively, default or preferred items may be distributed along the guide line to appear more prominent than other less preferred items. Further, the spacing between items can be defined by a pattern or mathematical function, or may be completely randomized.

Since the object or at least a portion of the object is visible when the items are displayed, the object is deemed to be non-obscured. Put another way, by displaying the items without obscuring the object, the items do not completely overlap or block the visibility of the object. Certain characteristics of the items, such as the transparency, color, or line thickness of the items can be altered (or selectively altered, for example where the items would otherwise overlap the object), to make the object more or less visible.

The items may be displayed without obscuring the object at a first point in time, such as a time where the items are initially displayed, and the items may obscure, occlude, obfuscate, block or overlap the object or a portion of the object at a second point in time that is earlier or later than the first point in time. By way of example, FIGS. 5 and 6 each illustrate items that are displayed without obscuring the respective objects, since at least a portion of the respective objects is visible in the user interface. In a further example, FIG. 9 illustrates items that are displayed without obscuring the associated object, since no portion of any item overlaps, blocks or interferes with the visibility of any portion of the associated object within the user interface.

Returning to FIG. 3, a selection of one of the displayed items is received (S305). In one implementation, a user interface may define a region around each item, where an item is selected if a cursor or control portion of an object is detected is within the item's associated region. The regions may be dynamically refined based upon user interactions, for example to increase in size based on a mouseover condition or upon detecting that a cursor has crossed the guide line, or to decrease the size of the region when a cursor is far away, is highlighting a different item, or has re-crossed the guide line.

As described in more detail below, the selection of an item may occur via several approaches, depending upon the type of input unit that the user uses to effect the selection. For instance, the selection may be a cursor-based user selection using a mouse, in which the user positions or hovers a mouse's cursor over an item to be selected (causing a mouseover event), presses down a mouse button (causing a mousedown event), and releasing the mouse button (causing a mouseup event). Other mouse events, such as a click event, a double-click (dblclick) event, or a mouseover event alone may also be used to select an item using a mouse.

Using a keyboard, a user may tab from one item to another, and select another keyboard key (e.g. a spacebar or the return key) to select a highlighted item, or the user may begin typing characters to narrow down or identify a desired item to select. Using a video game controller or handheld remote control, a user may press a directional pad to change which item is highlighted, and press a button to select the highlighted item. Using a mobile device with a tilt sensor, the user may tilt the device left, right, up or down to move a cursor or other indicator left, right, up or down until a desired item is highlighted, and then press a key or shake the mobile device to register the selection. Using a touch screen device, the user may directly touch the X and Y coordinates of the user interface where the desired item is output. Using a voice interface, the user may say commands such as "tab," "left," "right," "select," or other similar voice commands move a cursor between items, and select a desired item.

A user may directly control an avatar using a mouse or video game controller. For example, using a video game controller, a user may move an analog control stick to move the avatar's arm, whereby the angle of the analog control stick is mapped to an angle of the avatar's arm. A user may directly control an avatar using a motion capture device, whereby the avatar's arms mimic the user's real arm motions.

The enhanced control described herein is compatible with video based control systems. Specifically, a camera may detect an image, such as an image of the user, and portions of the image, motion within the image, or identified gestures from the image may be dynamically mapped to a cursor, in real time or near real time. Although further description of other input mechanisms, approaches or techniques are omitted for the sake of brevity, it suffices to say that an item may be automatically or manually selected using any conceivable approach, technique or mechanism.

The object may be a representation of a user, such as an avatar. By displaying a representation of the user in the user interface, training requirements are reduced since the user may easily recognize the object's position relative to the position of the items, and may quickly move a position of a cursor or control portion of the avatar (such as a hand) to be coincident with the position of a desired item. In this regard, the position of the cursor or control portion of the avatar is used to detect selections or 'touches' of items displayed in the user interface.

In the case where the object is an avatar, potential control portions of the avatar may be designated as a control portion to be animated. For instance, a control portion may be one or more arms, legs, elbows, knees, hands, or fingers of the avatar; or the head or torso of the avatar, or bodily features of the avatar such as a nose, eyes, ears, belly button, neck, or hair; or clothing, accessories or other accoutrements of the avatar such as clothing, jewelry or other personal items. As user inputs are received, the designated control portion is animated so as to interact with, or to give the appearance of interaction with, the items.

In the case where the object has the appearance of a knob or switch, a control portion may be an arrow that extends from the body of the object, and the object may rotate to point towards an item. In the case where the object includes a particle system effect, such as a simulation of flames, plasma, lightning, or liquid, particles may form an extension that points towards an item, such as a lightning bolt or a deformation of a water droplet, to give the appearance of interaction with an item.

In FIG. 6, for example, the object 602 is an avatar, and the arm 604a of the avatar is designated as the control portion. As the user moves a mouse left or right, the arm 604a is animated to move left or right, respectively, and items are selected based on the proximity of an item to the arm or, more particularly, a hand or fingers on the arm. Similarly, the hand 607 may also be designated as the control portion. In similar arrangements, movement of a mouse up or down may cause the arm 604a or hand 605 to move up or down, such as in manner befitting of human motion.

Since these up or down motions may move the arm 604a or the hand 605 away from the items, at certain points when the arm 604a or the hand 605 is not near to (or is not interacting with) an item or the guide line, the ostensible "selection" of an item will not cause the item to be output. By defining the guide line so that the avatar is for the most part below the guide line, the selection of characters or items by the object may occur by positioning the avatar's hands overhead of the avatar and above the guide line.

The designation of a potential control portion of an avatar as the control portion may be dynamically swapped to another control portion. For instance, and again referring to FIG. 6, if the user moves a mouse to the right past a position associated with item 606n, the control portion may be swapped from left arm 604a to right arm 604b, enabling the left arm 604a to interact with and select all items to the left of item 606n along the guide line 601, and enabling the right arm 604b to interact with and select all items to the right of item 606o along the guide line 601. Such a feature may increase the visual pleasure of the user experience because, instead of merely selecting items along the items using a plain mouse cursor, the user appears to be controlling an avatar that reacts in a realistic and intuitive manner.

If swapping occurs and the left arm 604a is no longer designated as the control object, the left arm 604a is animated to return to a neutral, resting, or relaxed position, such as a position along the side of the torso of the object 602. Conversely, such a swapping would cause the right arm 604b to be seamlessly animated to move from the relaxed position along the side of the torso of the object 602 to position previously occupied by the arm 604a, or a position adjacent to that position. Continuing with this example, if the user were to quickly move the mouse cursor back and forth between the space along the guide line bounded by items 606n and 606o, the avatar could be animated as alternatively flapping their arms from the side of the object 602 to overhead the object 602, in a pleasing, humorous, or visually stimulating manner.

In a further example, the eyes of an avatar may be designated as the control object, and they may appear to stare at or follow items along a guide line that may surround the object. Other portions of the avatar that are not designated as the control object may also be animated, for instance to appear to be react to a highlighted item, or to position the avatar in a desired pose or a more realistic pose based on a highlighted item. In one implementation, a mouth of an avatar may be animated to appear as if it is speaking or otherwise verbalizing a selected or highlighted item, or the neck or head of an avatar may be animated to be craned, thereby increase the emphasis that the appearance that the avatar is straining to look at or consider a highlighted object.

In a similar manner, if multiple objects (e.g. multiple avatars) are displayed in the user interface, a second object may be swapped in as a controlling object based on a user selection, upon proximity to a highlighted letter or the enhanced control, or based on any other factor. Thus, the control portion or control object designation may be swapped from the first potential control portion or object to a second potential control portion or object, or from the second potential control portion or object to the first potential control portion or object.

Returning to FIG. 3, the selected item is output (S306), and the process 300 ends (S307). Outputting the selected item may further include displaying the selected item, outputting an electronic indicia of the selected item, or highlighting the selected item by changing a color, opacity or size of the selected item within the user interface. The selected item or an indicia of the selected item may be output to another device or a storage medium for later use.

In FIG. 4, the color, opacity or size of the selected item 406r has been changed to a first degree or extent, thereby making the selected item 406r appear the largest out of all of the items displayed along the guide line 404, and the color, opacity or size of items 406p and 406t, which are adjacent to and equidistant from selected item 406r, have been changed to a second, lesser degree or extent. By also changing the color, opacity, size or other characteristic of adjacent items, the user can identify the position of a cursor or of a selected item more easily, increasing the intuitive nature and ease of use of the control. The color, opacity, size, or other characteristic of items may indicate the cursor position even where no cursor image is explicitly rendered.

Since the enhanced control allows for the selection of a small number of items at a given point in time and most items thus remain unselected, the unselected items may be reduced in size to allow for a large number of items to be displayed within the user interface. Increasing the size of certain items under consideration for selection, however, may increase the overall recognition or readability of the items under consideration for selection, thereby increasing reliability of the control. Put another way, in decreasing the size of unselected items, a larger number of selectable items can be presented to a user than could otherwise be discretely selected or touched.

As described in more detail below, the selected item 406r may be output in output region 407 of the user interface 401, along with previously selected item 406f, and forecasted items 409, which are dynamically determined based on the currently selected and previously selected items using forecasting or prediction heuristics.

The enhanced control provides for the on-screen selection of items from a set of items, such as the selection letters from the alphabet. A representation of the user is displayed, such that the representation may conveniently and reliably touch user selectable items aligned along a guide line or arc dynamically positioned relative to a representation. A touch may be determined where a part of the representation intersects with an item's region along the guide line. When a portion of the representation enters the touch region, items near that touch region may be zoomed-in or otherwise highlighted.

Figure 11A:
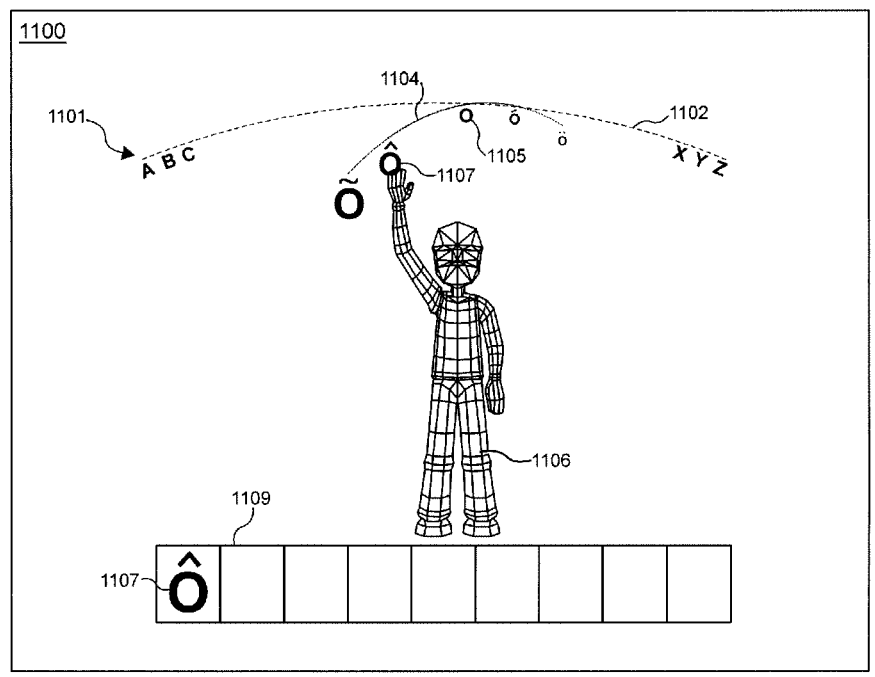

Although the guide line is described above as being defined in two dimensions relative to the object or the bounds of the user interface, the guide line may also be defined in three dimensions. For instance, and as illustrated in FIG. 11A, the guide line 1101 may have a first guide line component 1102 generally defined within the same X-Y plane as the user interface, as well as a second guide line component 1104 generally defined within the Z plane, appearing to extend orthogonally in relation to the X-Y plane of the user interface. Other planes or axis may be used.

Using a three dimensional guide line, the number of items that can be displayed with the control may be exponentially increased. For instance, in addition to selecting the item "O" on the guide line 1101 by moving the arms of the avatar 1106 left and right, the user may move the arms forward or backwards to select other items, such as the character "Ô" 1107, which is displayed in the output region 1109 when selected. Both guide line components 1102 and 1104 are defined within the three-dimensional reach of the arms of the avatar 1106.

Figure 11B:
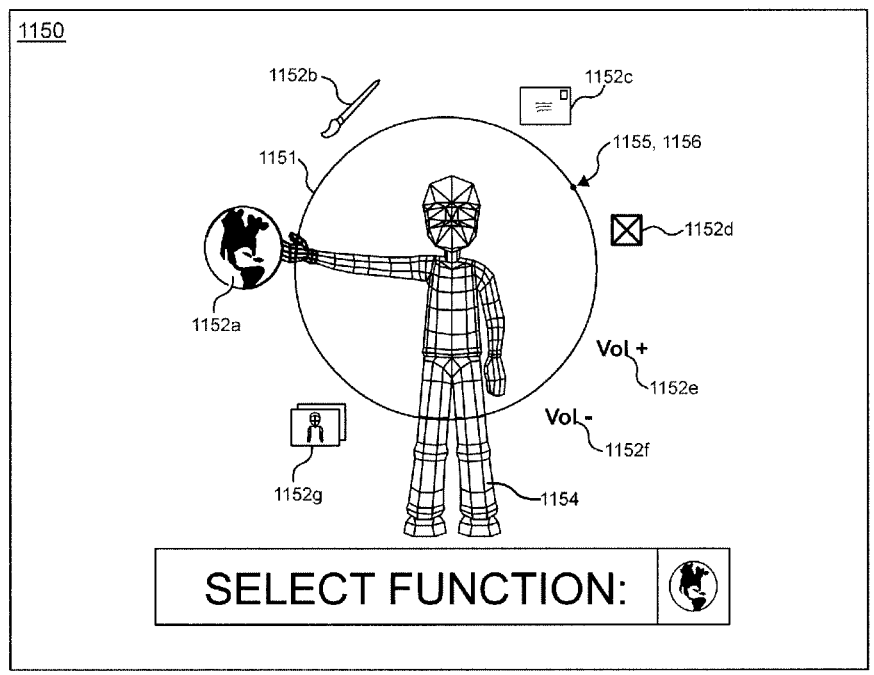

Furthermore, although the guide line has been described above as including discrete starting and ending points, in other implementations the guideline may not have starting and ending points, or may have the appearance of no starting and ending points, or the starting and ending points may be coincident. User interface 1150 in FIG. 11B, for example, includes a circular guide line 1151 for the selection of items 1152a to 1152g. The circular guide line includes starting point 1155 and ending point 1156, however these points are coincident and not otherwise highlighted or visible on the guide line 1151 over any other points.

Figure 12:
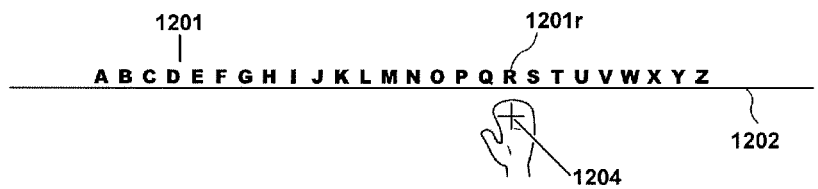
FIGS. 12 to 14 illustrate the exemplary selection of an item aligned along a guide line.
Figure 13:
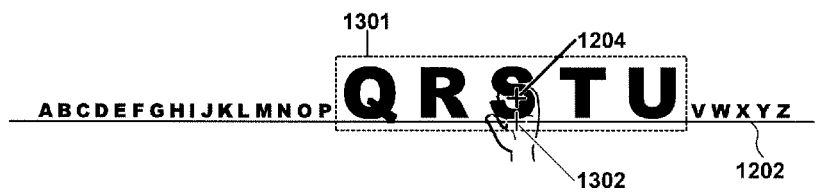

Furthermore, and unlike some other exemplary controls, the items 1152a to 1152g each correspond to a function to be invoked by an application, as represented by an icon. For instance, when the avatar 1154 selects the globe icon 1152a, a mapping application may be invoked. As such, the enhanced control described herein can be used for the selection of characters as well as to invoke more complex functionality, in an instinctive and visually pleasing manner. Other icons may represent other functions, including media functions such as a volume up or down function, a send mail function, a disable control function, or an image viewer function FIGS. 12 to 16 illustrate the exemplary selection of a particular item from a set of items 1201 aligned along a guide line 1202. In FIG. 12, a cursor 1204, which is mapped to and depicted as a hand of an avatar, moves toward an item of interest 1201r. In FIG. 13, the position of the cursor 1204 crosses the guide line 1202. The crossing of the guide line 1202 may initiate a further detection process which selects or identifies a subset 1301 of the items 1201 based on a distance between each item and the cursor 1204.

The subset 1301 of the items 1201 are displayed in a larger size or scale of font, facilitating easier selection by the user. Selection of the subset 1301 of the items 1201 and the enlarging of the display of the subset 1301 of the items 1201 may occur in response to detecting that the cursor 1204 has crossed the guide line 1202, or may occur irrespective of the position of the cursor 1204 relative to the guide line 1202. Upon detecting that the cursor 1204 crosses the guide line 1201 at base position 1302 or that an item has been selected, user feedback may be generated, including for instance sound, imagery, and/or tactile output such as a vibration.

Figure 14:
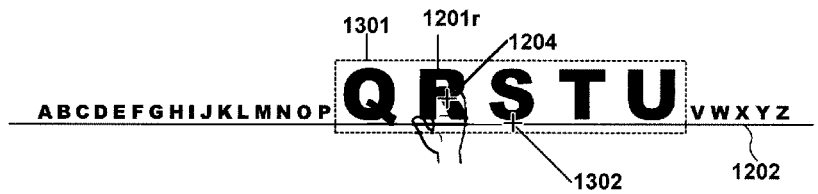

The user selects the item of interest 1201r in FIG. 14. Highlighting the subset 1301 permits the user to select a general area containing the item of interest 1201r, to "zoom in" on items within that area, and to reliable and conveniently select the item of interest 1201r, which represents the letter "R." Selection may occur using mouse events, keyboard or keypad strokes, or through many other approaches.

Figure 15:
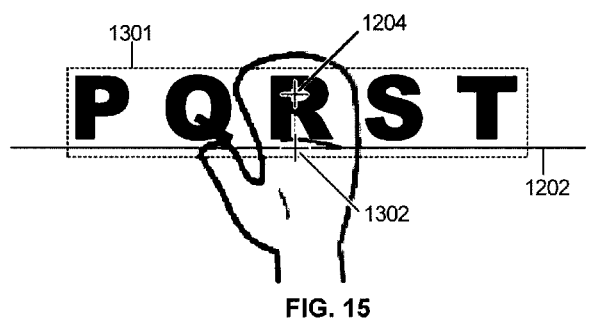
FIGS. 15 and 16 illustrate the determination of a base position along a guide line.

The location of the base position 1302, representing the position where the cursor 1204 has crossed the guide line 1201, may be detected in many ways. For instance, and as shown in FIG. 15, the location of the base position 1302 may be determined as a position on the guide line 1201 nearest to the cursor 1204 observed at a time after the cursor 1204 is detected above the guide line 1201, or nearest to a highlighted item such as item 1201r.

Figure 16:
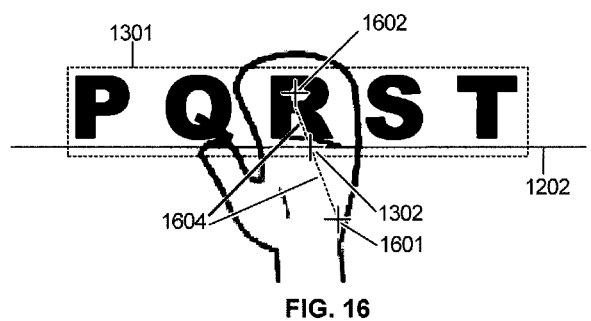

The base position may be detected using other approaches as well. For instance, the location of the base position 1302 may be detected as the cursor 1204 crosses the guide line 1201, or using positions of the cursor 1204 at times before and after the crossing of the guide line 1201. FIG. 16, for instance, illustrates endpoint 1601, representing a position of the cursor 1204 observed at a time prior to crossing the guide line 1202, and endpoint 1602, representing a position of the cursor 1204 observed at a time after crossing the guide line 1202. The base position may be determined as the intersection of the line segment 1604 defined by the endpoints 1601 and 1602, and the guide line 1201.

Highlighting the subset 1301 of the items 1201 may include determining a position along the guide line 1201 of the items that make up the subset 1301. In some implementations, items positioned in proximity to the base position 1302 are selected to be part of the subset 1301 of the items 1201 to be highlighted (e.g. displayed in a large size), such that items near the base position 1302 remain in or near their original unhighlighted positions, and items further away from the base position 1302 move outwards to accommodate for the increase in size of the subset 1301 of the items 1201.

Equation (1), below, may be used to determine the position of items that are not within the subset 1301 after the subset 1301 has been highlighted.

$$X_i' = X_b + (X_i - X_b) \cdot \left(\frac{S_i'}{S_i}\right) \quad (1)$$

Figure 17:
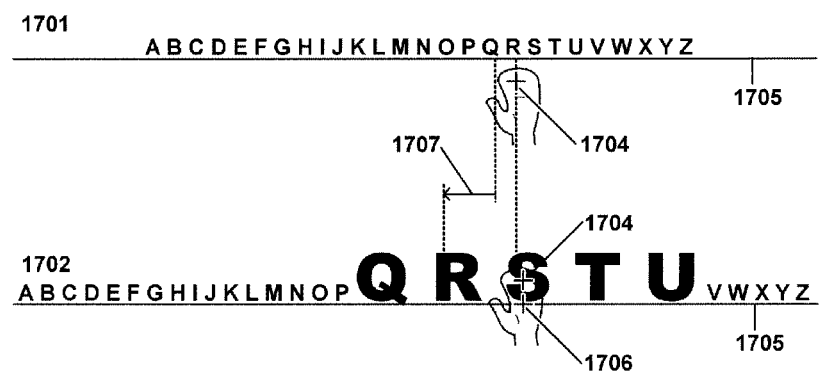
FIGS. 17 to 19 illustrate subsets of items in various states associated with the highlighting of subsets.

In Equation (1), $X_i$ represents the position of item i along the guide line, in the original state; $X_i'$ represents the position of item i along the guide line, in the enlarged state; $X_b$ represents the base position along the guide line; $S_i$ represents the base size of item i in the original state; and $S_i'$ represents the size of item i in the enlarged state FIG. 17 illustrates a subset of items in a first state 1701 prior to the highlighting of the subset of items, and in a second state 1702 after the highlighting of the subset of items. For example, if a cursor 1704 initially crosses the guide line 1705 under the item "S" (such that the base position 1706 is coincident to the item "S"), the item "S" remains in its original position and the item "R" is displaced by distance 1707 towards the left relative to its original position. The second state 1702 thus demonstrates the items' scaled size and position following highlighting.

Figure 18:
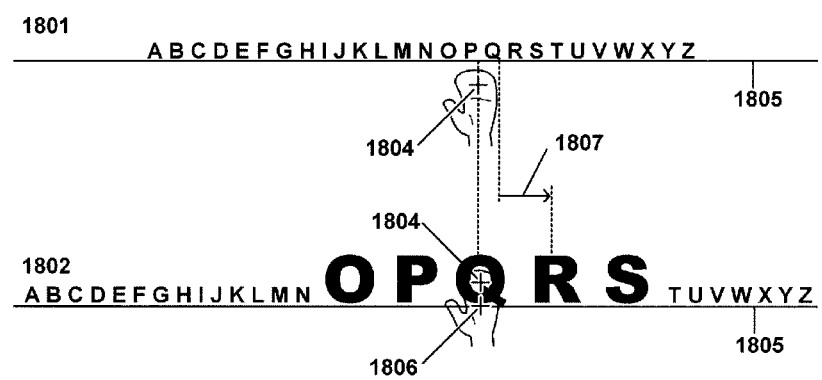

FIG. 18 illustrates a subset of items in a first state 1801 prior to the highlighting of the subset of items, and in a second state 1802 after the highlighting of the subset of items. For example, if the cursor 1804 crosses the guide line 1805 under the item "Q" (such that the base position 1806 is coincident to the item "Q"), the item "Q" will remain in its original position and the item "R" is displaced distance 1807 towards the right relative to its original position. The second state 1802 thus demonstrates the scaled items, where an item display 701 represents the items' scaled size and position following highlighting. Accordingly, the position of the cursor 1804 used to select a particular item may be dependent on the position where the cursor 1804 initially crossed the guide line 1805.

Figure 19:
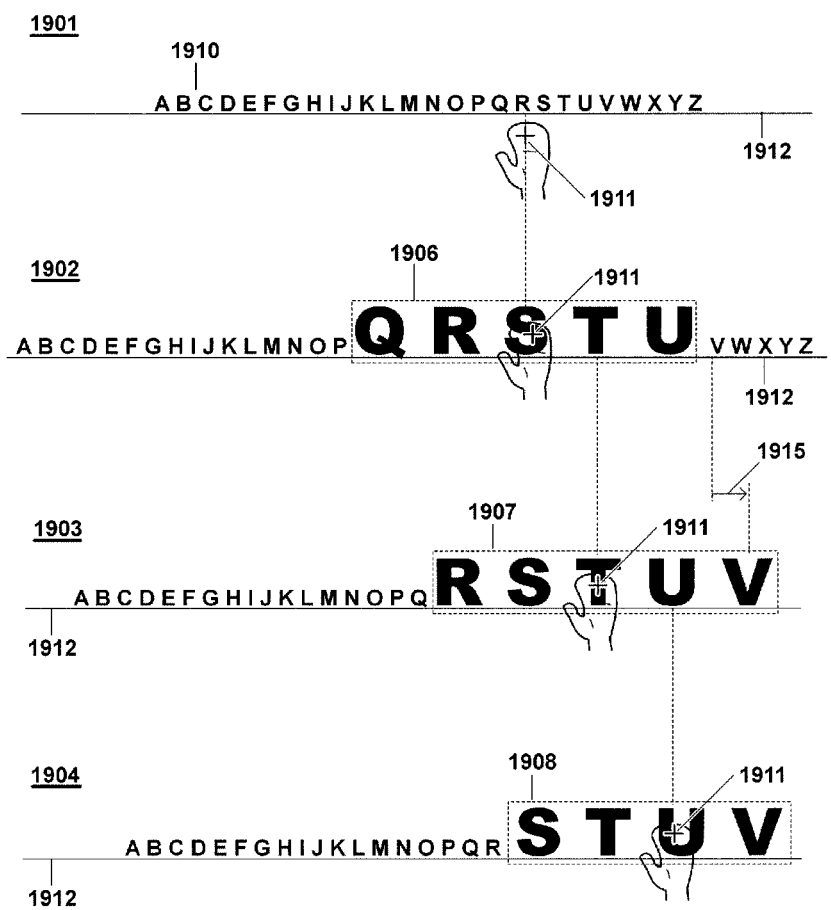

FIG. 19 illustrates a subset of items in states 1901 to 1904 associated with the highlighting of the subset of item. Specifically, FIG. 19 shows an overview of the selection and highlighting of first through third subsets 1906 to 1908 of items 1910. The second and third subsets 1907 and 1908 may be positioned according to the position of a cursor 1911 relative to first and second subsets 1906 and 1907, respectively.

In state 1901, the items 1910 reflect their original, unhighlighted size and position. In state 1902, the first subset 1906 of the items 1910 has been selected and highlighted. In state 1903, the second subset 1907 of the items 1910 has been selected and highlighted. In state 1904, the third subset 1908 of the items 1910 has been selected and highlighted.

In state 1902, the cursor 1911 initially crosses the guide line 1912 under the item "S" (such that the base position 194 is coincident to the item "S"), the item "S" remains in its original position and the surrounding letters are displaced outwards from their original positions. Transitioning from state 1902 to state 1903, if the cursor 1911 moves to right, the second subset 1907 of the items 1910 within a distance of the cursor 1911 is selected. In the state 1903, if the cursor 1911 moves along the guide line 1912 to be coincident to the enlarged item "T", the item "T" remains in its enlarged position and the item "V" is highlighted moved distance 1915 further towards the right along the guide line 1912.

If insufficient space exists on the guide line 1912 for certain items, such as items "W" through "Z," the items are "pushed off" the end of the guide line, and are not displayed. Transitioning from the state 1903 to state 1904, if the cursor 1911 continues to move further towards the right end of the guide line 1912, there may also be insufficient space to display additional items that are part of the second subset 1907, and the third subset 1908 may be formed (as a subset of the second subset 1907).

In order to select an item on the right portion of the second subset 1907 such as the item "U," or an item that has been "pushed off" the end of the guide lines such as the items "W" to "Z," the user may re-cross the guide line 1912 with the cursor 1911, and cross the guide line 1912 a third time to establish a new base position nearer to the desired item. Furthermore, instead of "pushing off" items to the right end of the guide line 1912, items on the left end of the guide line may be "pushed off" instead to accommodate for the display of items that would otherwise be "pushed off" of the right end. In some implementations, instead of "pushing off" items, items may be decreased in size according to the available space on a guide line so that all items are displayed on a guide line.

In other implementations, items "pushed off" the right end of the guide line may re-appear on the left end of the guide line. In implementations utilizing a continuous (e.g. circular) guide line, items may be pushed around the guide line. Therefore, in an example of a circular guide line where a user may move a cursor clockwise around a continuous guideline, items excluded from the current subset of items may flow clockwise at a lesser angular velocity than the cursor (as they make room for items to grow as they are added to the subset). In this example, a cursor may move multiple revolutions around a guide line for one revolution of an item around the guide line.

Scrolling may be used to facilitate a selection of items that would otherwise have been pushed off an end of a guide line. Scrolling may include detecting if a cursor 1911 is within a predefined distance of an end of a guide line 1912, and applying a velocity to item positions. Where item positions are calculated relative to a base position 1914 (see Equation (1), above), the velocity may be applied to the base position 1914, and items may be displaced accordingly.

Figure 20:
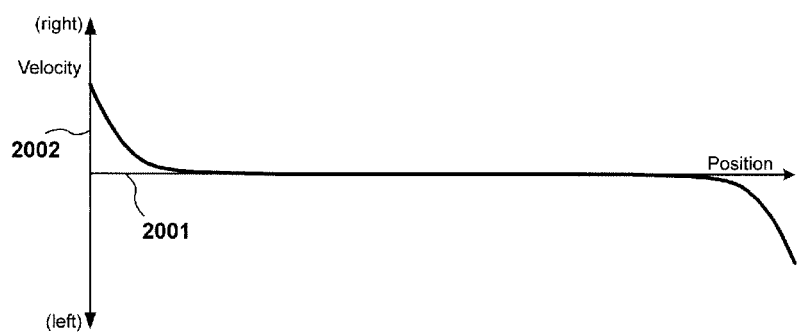
FIGS. 20 and 21 illustrate exemplary velocity and scaling functions, respectively.

FIG. 20 illustrates an exemplary velocity function, in which the horizontal axis 2001 represents positions along a guide line, and the vertical axis 2002 represents velocity. Using this velocity function, items are moved or shifted by applying a velocity when the cursor position is near an end of the guide line, and items are not moved or shifted (since the velocity is zero) when the cursor position is at the center of the guide line.

Figure 21:
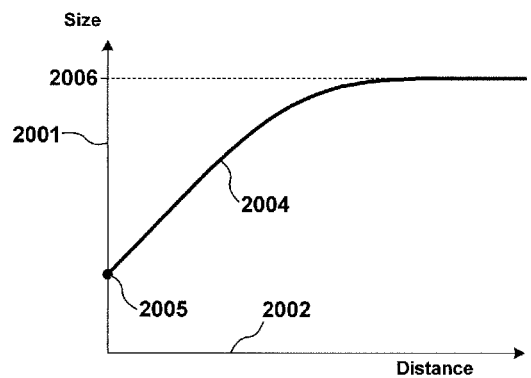

FIG. 21 illustrates an exemplary scaling function which may be used to scale the size of an item (reflected by vertical axis 2001) in a subset of items based on a distance (reflected by horizontal axis 2001) between the position of a cursor relative to a guide line. As represented by the curve 2004, the size of an item ($S_i'$) may thus be a function of the current position of a cursor. A base size ($S_i$) associated with unhighlighted items or all items if the cursor has not crossed the guide line is determined by referencing point 2005, and line 2006 defines a maximum size associated with a highlighted item.

In one example implementation, the slope of the curve 2004 is approximately 1:1 near the point 2005, so that item sizes appears to grow linearly and proportionally as the proximity to the cursor decreases. Growth of the item would begin to off near the maximum size, to produce an aesthetically pleasing transition as the cursor becomes increasingly proximate to a highlighted item.

Figure 22:
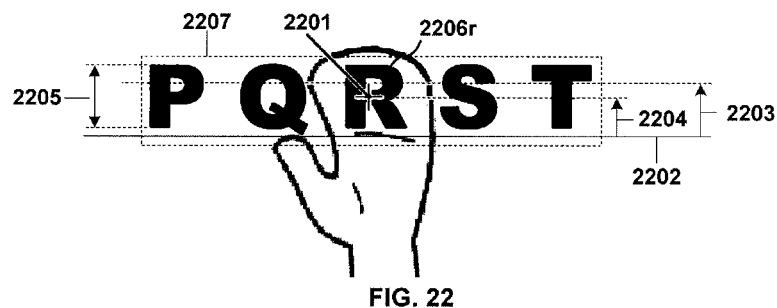
FIGS. 22 and 23 illustrate the use of a scaling feature by an exemplary enhanced control.
Figure 23:
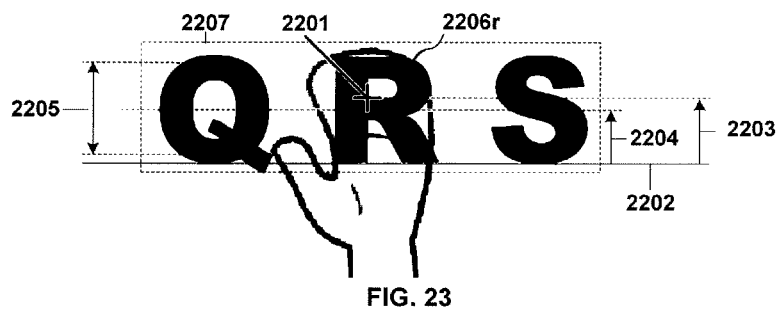

FIGS. 22 and 23 illustrate the use of the scaling feature by the enhanced control, specifically occurring when a cursor 2201 crosses a guide line 2202. A height 2204 represents a distance between the position of the cursor 2201 and the guide line 2202, and a height 2205 represents a size of items, such as item 2206r, in a subset 2207. The height 2205 of items in the subset 2207 is scaled based on the height 2204, making items appear larger in FIG. 22, where the cursor 2201 has crossed the guide line 2202 by a small amount, than in FIG. 23, where the cursor 2201 has crossed the guide line 2202 by a smaller amount.

Figure 24:
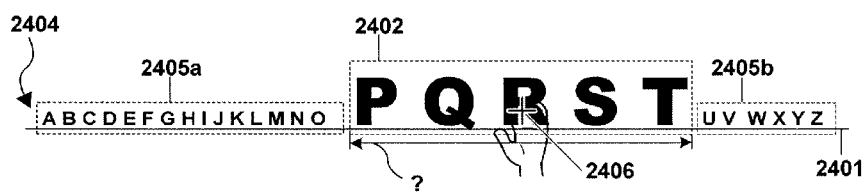
FIGS. 24 and 25 illustrate exemplary guide lines in which a subset of items is highlighted.
Figure 25:
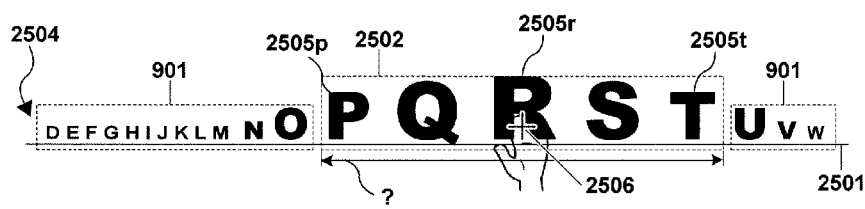

FIGS. 24 and 25 illustrate exemplary guide lines in which a subset of items is highlighted. Specifically, FIG. 24 illustrates an exemplary guide line 2401 in which a subset 2402 of items 2404 is displayed in an enlarged manner. Selecting the subset 2402 of items 2404 may include selecting a predefined number of items, or dynamically selecting a number of items to include within the subset 2402 based on the size of the items.

The number of items to include in the subset 2402 may be dynamically selected so that the items of subset 2402 span the entire length of the guide line 2401, or they may span a portion of the guide line 2401. As shown in FIG. 24, items 2405a and 2405b that are excluded from the subset 2402 may also be displayed along the guide line 2401. The number of items in the subset 2402 may also change based on size of the items within the subset, for example where subset 2207 (in FIG. 22) displays five items, and subset 2207 (in FIG. 23) displays three items, even though the width of the subset 2207 remains the same.

Highlighting items by displaying the items of a subset at a large size may include displaying all of the highlighted items at the same large size, as illustrated in FIG. 24, or by displaying individual items within a subset at a size that is dependent on its position along the guide line relative to a cursor position, as illustrated in FIG. 25.

FIG. 25 illustrates an exemplary guide line 2501 in which a subset 2502 of items 2504 is displayed with a varying item size. For example, the size of items 2505p and 2505t at the ends of the subset 2502 (representing letters "P" and "T," respectively), may be sized smaller than the item or items at the center of the subset 2502, such as the item 2505r (representing the letter "R"). Displaying items in the subset 2502 with varying sizes may produce a pleasing aesthetic appearance and may make use of the enhanced control more intuitive.

Displaying the items of the subsets 2402 and 2502 at a large size may include animating the items. An animation may include enlarging the items of the subset and translating the position of items along the guide line (e.g., keeping the items perpendicular to the guide line) over a short period of time. Items that are excluded from the subsets 2402 and 2502 may be animated to shrink in size and move outwards along the guide line, in order to "make room" for the subset 104.

Items that are "pushed off" from the ends of a guide line may simply disappear, or may be animated to fall off the edge of the guide line or to be destroyed in a visually stimulating or humorous manner, such as by combustion, implosion, vaporization, explosion, liquefaction, crushing, or other techniques. Similarly, previously "pushed off" items that reappear due to space being made on the guide line may simply reappear, or may be animated to fall from the top of the user interface back onto the guide line or to be spontaneously generated in a visually stimulating or humorous manner.

Returning to FIG. 8, where a guide line is discontinuous, items may be animated to move across the discontinuity. Items may be animated to move across the gap at a high velocity, or may be animated to be "pushed off" and "reappear" using any of the above visual effects. Likewise, items that are "pushed off" one end of a guide line to re-appear on the opposite end may be animated to move between the guide line end points at a high velocity, or may be animated to be "pushed off" and "reappear" using any of the above visual effects.

Figure 26:
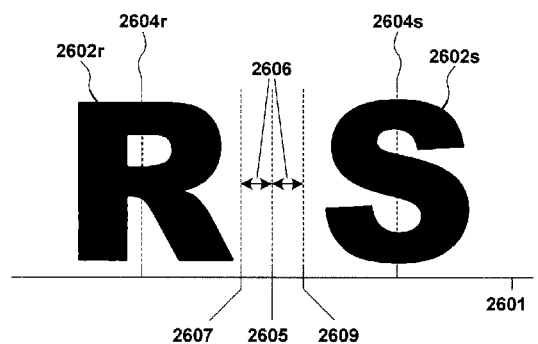
FIG. 26 depicts the activation of an item along a guide line.

FIG. 26 depicts the activation of an item along a guide line, where "activation" or "highlighting" generally relate to the determination of an item to select. A system to determine an item to select may use hysteresis. Selection may include determining an initial selected item when a cursor initially crosses a guide line, where the initial selected item may be the item whose position is nearest in distance to the base position. Thereafter, in order to reduce inadvertent flicker between two adjacent items when a cursor is disposed in between items, selection may include determining a new selected item whenever the cursor moves a predefined distance beyond the midpoint between adjacent items.

For example, the position along a guide line 2601 of two items 2602r and 2602s are indicated by lines 2604r and 2604s, the position of the midpoint between the items 2602r and 2602s is indicated by line 2605, and a distance 2606 represents a predefined distance. If, for example, the item 2602s (i.e. the letter "S") is the initial selected item, the user would move a cursor left of line 2607, which is the predefined distance 2606 beyond the midpoint 2605 in the direction towards the item 2602r (i.e. the letter "R") to select the item 2602r. If the item 2602r is subsequently selected, to re-select the item 2602s, the user would move a cursor right of line 2609, which is the predefined distance 2606 beyond the midpoint 2605 in the direction towards the item 2602s.

The predefined distance may be defined based upon a desired maximum distance a cursor may be expected to waver or shake while the user attempts to remain still, accounting for the effects of user movements caused by involuntary body tremor or limitations of the input unit. An item may be deselected when the position of the cursor is below the guide line, or when a cursor is not found or is not within a particular user interface or region of the user interface occupied by the enhanced control. Selection of an item may further generate user feedback, including for example sounds, imagery, and/or a tactile output such as a vibration.

Displaying the items of the subset may include displaying items such that their appearance provides user feedback as to their state of selection. For example, a selected item may be displayed in a unique color, or be displayed with a visual effect such as the appearance of glowing. A currently selected item may be activated or highlighted when the item is in a selected state for longer than a first predefined duration threshold. In this regard, an item is activated when a cursor is held over an item for a period of time. Activation may be repeated or negated if a selected item remains selected for longer than a second predefined duration threshold.

Moreover, an item may be activated or highlight when a position of a cursor is stationary for a period of time. A cursor may be classified as stationary when the change in the component of position parallel to the guide line is less than a predefined distance threshold for more than a predefined time threshold. For example, an item closest to the position of the cursor is identified and activated. Activation may be repeated or negated if a cursor remains classified as stationary for longer than a second predefined duration threshold. Additionally, an item may be activated based on a distance between a cursor position and relative a guide line. For instance, an item may be activated when such a distance exceeds a predefined distance threshold 803, as shown in FIGS. 22 and 23.

In other examples, activation of item may result from another type of user input after selection of the item. For instance, the user may provide another type of user input to activate a selected item. In these examples, to activate a selected item, the user may touch a user input button (e.g., on a controller), provide an audible input (e.g., saying "activate"), performing another type of gesture (e.g., moving the hand used to select the item toward the display or moving the user's other hand to another portion of the display image to activates the selected item), or providing any other type of user input.

Figure 27:
FIGS. 27 to 30 illustrate exemplary item sets.

FIGS. 27 to 30 illustrate exemplary item sets. In FIG. 27, items 2701, which include characters from the English alphabet, includes an item 2702 that, when activated or otherwise selected, opens a second set of items. When selected, the second set of items may appear along the guide line 2704 with the items 2701 or a portion of the items 2701, or the second set of items may replace the items 2701 on the guide line 2704. From the symbol used to represent the item 2702, the user may intuitively determine that the second set of items includes numbers.

Figure 28:
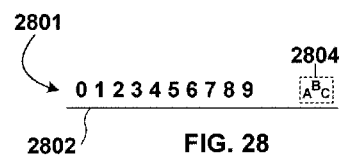

FIG. 28 illustrates items 2801 aligned with a guide line 2802. Items 2801 are displayed when the item 2702 in FIG. 27 is selected. Once the second set of items is selected, removal of the cursor below the guide line 2802 or removing the cursor from the user interface that displays the items 2801 may cause the items 2701 to be re-selected or re-activated. The items 2801 includes an item 2804 that, when activated, re-opens, re-activates or otherwise re-selects the items 2701. From the symbol used to represent the item 2804, the use may intuitively determine that the items 2701 include characters from the English alphabet.

Figure 29:
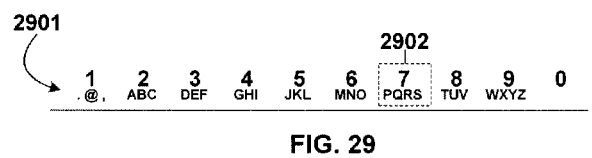
Figure 30:
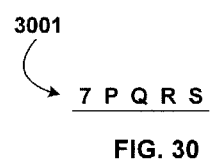

FIG. 29 illustrates items 2901 aligned with a guide line 2901, where the items each represent a combination of a number and letters that are known to be associated with keys on a standard telephone phone keypad. FIG. 30 illustrates items 3001, which are displayed when item 2902 of items 2901 are selected (see FIG. 29), and which include the combination of characters the number "7" associated with the key number "7" on a standard telephone keypad.

Using the items illustrated in FIGS. 27 to 30, a text input mechanism may be provided, such as by sequentially filling in letters that form words into a text field. Upon activating a number, letter, text symbol, or predefined text, the number, letter, text symbol, or predefined text may be appended to a string of characters that has already been input. Alternatively, activation of an item (such as an item from items 2701 in FIG. 27) may display further items, and activation of an item of the further items may appends the activated character onto a string of characters. One of the items may be a backspace item, to facilitate removal of the latest item from the string of items.

A text input mechanism may include combining characters to form compound characters. A text input mechanism for Japanese text input may include combining kana characters to form kanji characters (in a method familiar to users of Japanese personal computer keyboards). A first set of items may include items representing kana. When a kana item is activated, the corresponding kana character is appended to a string of characters. A set of items may include an item representing an operation, that when activated, activates a process that converts the latest kana characters of the string into kanji. The process of converting the latest kana characters of the string into kanji may include displaying a second set of candidate kanji items. Activating a kanji item activates a process where the latest kana characters of the string are replaced with the activated kanji. This text input method may be extended to other languages.

An alternative method for Japanese text input may include displaying a first set of items representing kana. When a kana item is activated, a second set of items is displayed. The second set of items may include the kanji for which the activated kana forms a part of. This set may be larger than the second set described above. This text input method may be extended to other languages.

A text input mechanism may include a confirmation item in a set of items. When activated, a confirmation item activates a process whereby the string of characters is provided to an application. Furthermore, the text input mechanism may include a predictive text completion process. A predictive text completion process may search a dictionary to find the most likely text that contains the characters of the string of characters. The most likely text may be displayed in an output field. A dictionary used in the predictive text completion process may be selected based on the context in which the text input mechanism is used. For example, a dictionary may include names when the text input mechanism is used to enter a name.

An application process may determine items for the user interface, depending on the state of the application. Activating an item may provide a message to an application process. The application process may be controlled based on the message.

Figure 31:
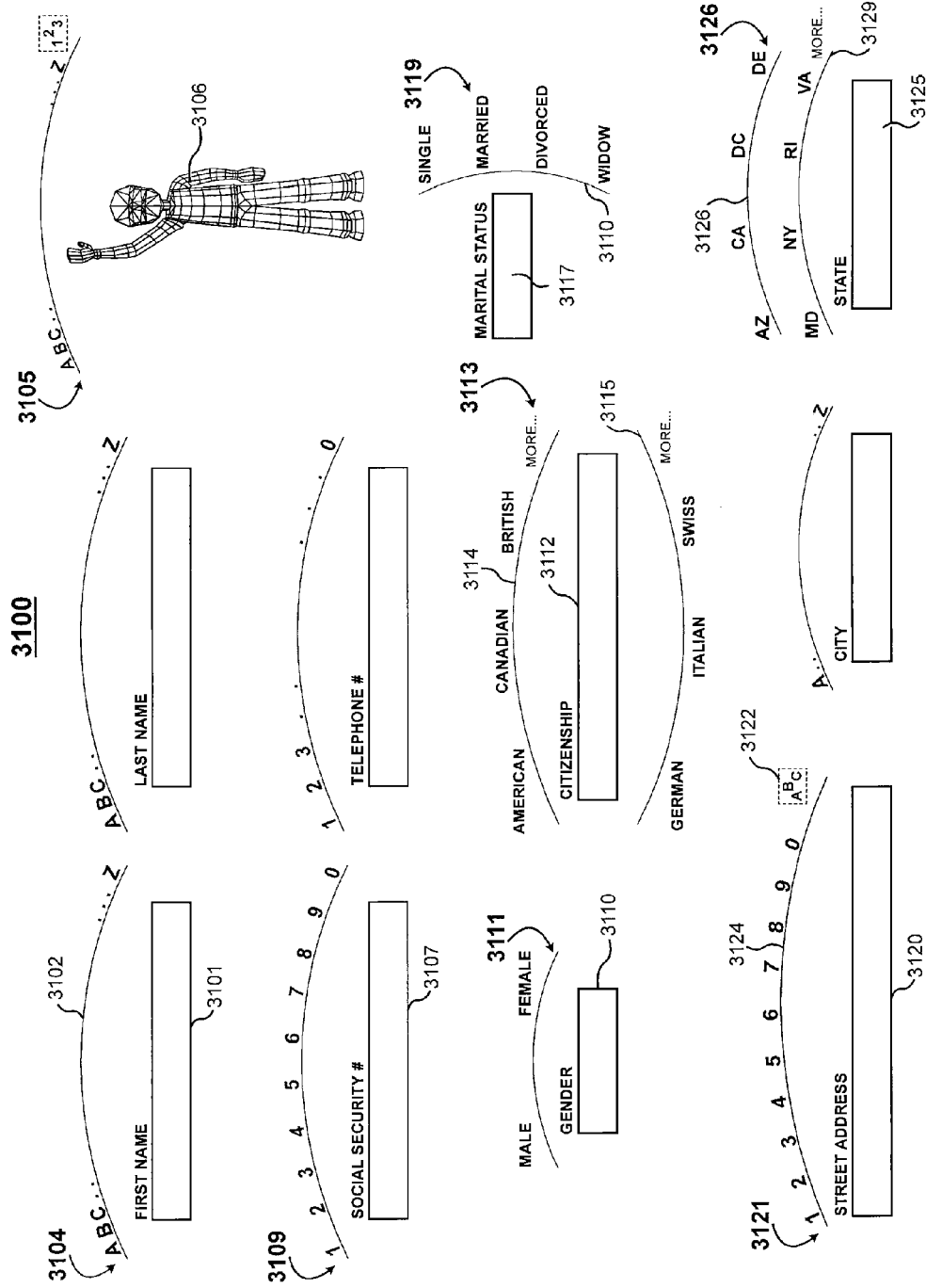
FIG. 31 illustrates an user interface that includes one or more exemplary enhanced control.

FIG. 31 illustrates an exemplary user interface 3100 including an exemplary enhanced control. As the user accesses the various text entry fields on the user interface 3100, the text entry fields are used as objects to define guide lines, and items appropriate to the text entry fields are displayed aligned with the guide lines without obscuring the text entry fields themselves. The user may select the items aligned with the guide lines, to populate the associated text entry fields. Although the user interface 3100 appears to illustrate multiple visible enhanced controls at once, such a simultaneous display is merely exemplary and is done to illustrate possible control positions, configurations, alignments and item types. In other user interfaces, for example, one enhanced control would be displayed at a time.

For instance, if the user accesses text entry field 3101, such as by tabbing to that field or selecting that field with a mouse cursor, guide line 3102 is defined relative to the text entry field 3101, and items 3104 are displayed aligned with the guide line 3102 so as to not obscure the text entry field 3101. Since the text entry field 3101 accepts text or character data, the enhanced control automatically determines that alphabetical character items 3104 are appropriate for the object type. When a user selects an item from the items 3104, the text entry field 3101 is populated with the selected item. Instead of selecting items from the guide line 3102, the user may also use the enhanced control 3105, defined around avatar 3106, for populating the various fields with items.

As the user tabs to or otherwise accesses other fields within the user interface 3100, other enhanced controls may be dynamically defined, outputting items for selection. For instance, accessing social security number field 3107 may cause numerical items 3109 to be displayed above the field 3107; accessing gender field 3110 may cause gender items 3111 to be dynamically output above the field 3110; accessing citizenship field 3112 may cause country items 3113 to be displayed on two guide lines 3114 and 3115 above and below the field 3112, respectively; accessing marital status field 3117 may cause marital status indicator items 3119 to be displayed on a guide line 3110 on the right side of the field 3117, where the guide line 3110 may be dynamically defined on the right side due to space constraints, user preferences, or other reasons; accessing street address field 3120 may cause items 3121 that include numbers and an alphabetical symbol 3122 that replaces the numbers with alphabetical characters along a guide line 3124 to be displayed on the guide line 3124 above the field 3120; and accessing state field 3125 may cause items 3126 that include state names to be displayed on two guide lines 3127 and 3129 defined above the field 3125.

Figure 32:
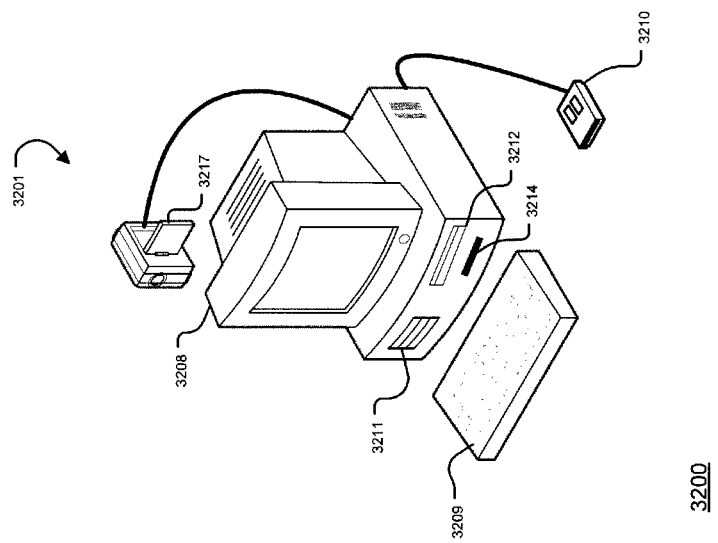
FIG. 32 illustrates an example of the exterior appearance of a computing device.

FIG. 32 illustrates an example of the exterior appearance of a computing device 3201 that further includes a processor and a user interface. The processor defines a guide line relative to an object in a user interface. The user interface displays, without obscuring the object, items aligned with the guide line, and outputs, based on receiving a selection of one of the displayed items, the selected item.

In more detail, the hardware environment of the computing device 3201 includes a display monitor 3208 for displaying text and images to interface with a user, a keyboard 3209 for entering text data and user commands into the computing device 3201, a mouse 3210 for pointing, selecting and manipulating objects displayed on the display monitor 3208, a fixed disk drive 3211, a removable disk drive 3212, a tape drive 3214, a hardcopy output device, a computer network connection, and a digital input device 3217.

The display monitor 3208 displays the graphics, images, and text that comprise the user interface for the software applications used by the computing device 3201, as well as the operating system programs necessary to operate the computing device 3201. A user uses the keyboard 3209 to enter commands and data to operate and control the computer operating system programs as well as the application programs. The mouse 3210 may be any type of pointing device, and may be a joystick, a trackball, a touch-pad, or other pointing device. Software used to display a user interface and enable a user to enter or select text, numbers, or select from a menu of options is stored locally on computer readable memory media, such as the fixed disk drive 3211.

In a further implementation, the fixed disk drive 3211 itself may include a number of physical drive units, such as a redundant array of independent disks ("RAID"), or may be a disk drive farm or a disk array that is physically located in a separate computing unit. Such computer readable memory media allow the computing device 3201 to access computer-executable process steps, application programs and the like, stored on removable and non-removable memory media.

The computer network connection may be a modem connection, a local-area network ("LAN") connection including the Ethernet, or a broadband wide-area network ("WAN") connection such as a digital subscriber line ("DSL"), cable high-speed internet connection, dial-up connection, T-1 line, T-3 line, fiber optic connection, a broadband over power line connection, or satellite connection. The network 1306 may be a LAN network, a corporate or government WAN network, the Internet, or other network.

The computer network connection may be a wireline or wireless connector. Example wireless connectors include, for example, an INFRARED DATA ASSOCIATION® ("IrDA®") wireless connector, an optical wireless connector, an INSTITUTE OF ELECTRICAL AND ELECTRONICS ENGINEERS® ("IEEE®") Standard 802.11 wireless connector, a BLUETOOTH® wireless connector, an orthogonal frequency division multiplexing ("OFDM") ultra wide band ("UWB") wireless connector, a time-modulated ultra wide band ("TM-UWB") wireless connector, or other wireless connector. Example wired connectors include, for example, a IEEE-1394 FIREWIRE® connector, a Universal Serial Bus ("USB") connector, a serial port connector, a parallel port connector, or other wireline connector.

The removable disk drive 3212 is a removable storage device that is used to off-load data from the computing device 3201 or upload data onto the computing device 3201. The removable disk drive 3212 may be a floppy disk drive, an IOMEGA® ZIP® drive, a compact disk-read only memory ("CD-ROM") drive, a CD-Recordable drive ("CD-R"), a CD-Rewritable drive ("CD-RW"), flash memory, a USB flash drive, thumb drive, pen drive, key drive, a High-Density Digital Versatile Disc ("HD-DVD") optical disc drive, a Blu-Ray optical disc drive, a Holographic Digital Data Storage ("HDDS") optical disc drive, or any one of the various recordable or rewritable digital versatile disc ("DVD") drives such as the DVD-Recordable ("DVD-R" or "DVD+R"), DVD-Rewritable ("DVD-RW" or "DVD+RW"), or DVD-RAM. Operating system programs, applications, and various data files, are stored on disks, which are stored on the fixed disk drive 3211 or on removable media for the removable disk drive 3212.

The tape drive 3214 is a tape storage device that is used to off-load data from the computing device 3201 or to upload data onto the computing device 3201. The tape drive 3214 may be a quarter-inch cartridge ("QIC"), 4 mm digital audio tape ("DAT"), 8 mm digital linear tape ("DLT") drive, or other type of tape.

Furthermore, although the computing device 3201 is described above as a desktop PC, in further implementations the computing device 3201 may be a laptop, a workstation, a midrange computer, a mainframe, an embedded system, telephone, a handheld or tablet computer, a PDA, a gaming device or console, a digital picture frame, a teleconferencing device, or other type of computer.

Figure 33:
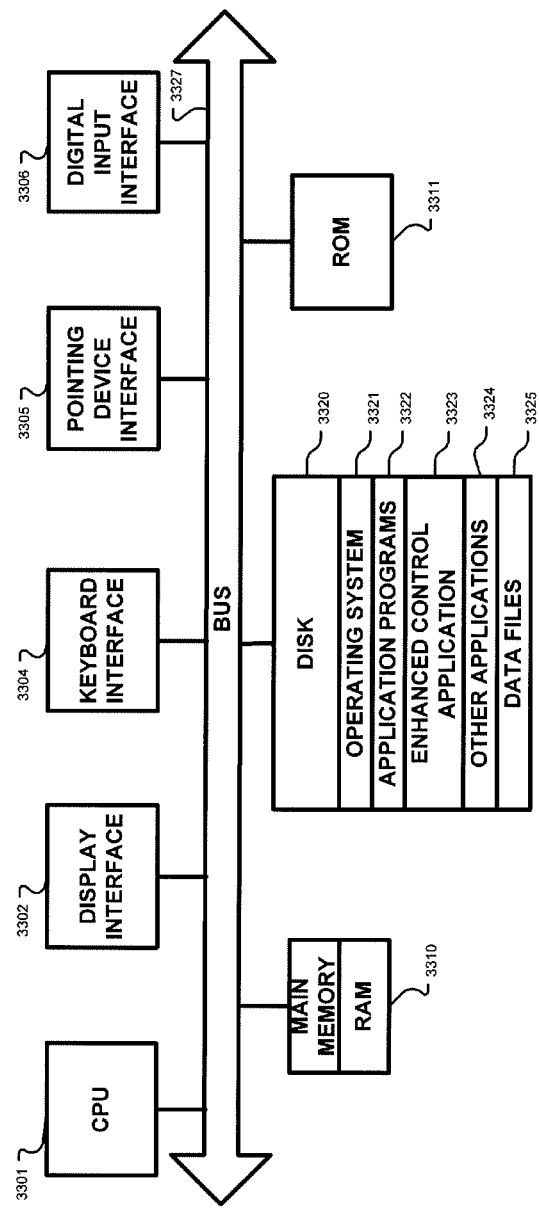
FIG. 33 is a block diagram illustrating the internal architecture of a computer shown in FIG. 32.

FIG. 33 is a block diagram illustrating the internal architecture of a computer shown in FIG. 32. An exemplary internal architecture of the computing device 3201 is now described. The computing environment includes a computer central processing unit ("CPU") 3301, where the computer instructions that comprise an operating system or an application are processed; a display interface 3302 which provides a communication interface and processing functions for rendering graphics, images, and texts on the display monitor 3208; a keyboard interface 3304 which provides a communication interface to the keyboard 3209; a pointing device interface 3305 which provides a communication interface to the mouse 3210 or an equivalent pointing device; a digital input interface 3306 which provides a communication interface to the digital input device 3217; a hardcopy output device interface which provides a communication interface to the hardcopy output device; a random access memory ("RAM") 3310 where computer instructions and data are stored in a volatile memory device for processing by the computer CPU 3301; a read-only memory ("ROM") 3311 where invariant low-level systems code or data for basic system functions such as basic input and output ("I/O"), startup, or reception of keystrokes from the keyboard 3209 are stored in a non-volatile memory device; and a storage 3320 or other suitable type of memory (e.g., such as random-access memory ("RAM"), read-only memory ("ROM"), programmable read-only memory ("PROM"), erasable programmable read-only memory ("EPROM"), electrically erasable programmable read-only memory ("EEPROM"), magnetic disks, optical disks, floppy disks, hard disks, removable cartridges, flash drives), where the files that comprise an operating system 3321, application programs 3322 (including the enhanced control application 3323, and other applications 3324 as necessary) and data files 3325 are stored; a computer network interface which provides a communication interface to the network over the computer network connection. The constituent devices and the computer CPU 3301 communicate with each other over the computer bus 3327.

According to one general implementation, a computer program product is tangibly embodied or recorded in a machine-readable medium such as storage 3320. The computer program product includes instructions that, when read by a machine, operate to cause data processing apparatus to define a guide line relative to an object in a user interface, to display, without obscuring the object, items aligned with the guide line, and to output, based on receiving a selection of one of the displayed items, the selected item.

The RAM 3310 interfaces with the computer bus 3327 so as to provide quick RAM storage to the computer CPU 3301 during the execution of software programs such as the operating system application programs, and device drivers. More specifically, the computer CPU 3301 loads computer-executable process steps from the fixed disk drive 3211 or other memory media into a field of the RAM 3310 in order to execute software programs. Data is stored in the RAM 3310, where the data is accessed by the computer CPU 3301 during execution.

The computing device 3201 stores computer-executable code for an operating system 3321, application programs 3322 such as word processing, spreadsheet, presentation, gaming, or other applications. Although it is possible to output the enhanced control a user interface and enable a user to enter text, numbers, or select from the control using the above-described implementation, it is also possible to implement the functions according to the present disclosure as a dynamic link library ("DLL"), or as a plug-in to other application programs such as an Internet web-browser such as the MICROSOFT® Internet Explorer web browser.

The computer CPU 3301 is one of a number of high-performance computer processors, including an INTEL® or AMD® processor, a POWERPC® processor, a MIPS® reduced instruction set computer ("RISC") processor, a SPARC® processor, an ACORN® RISC Machine ("ARM®") architecture processor, a HP ALPHASERVER® processor or a proprietary computer processor for a mainframe. In an additional arrangement, the computer CPU 3301 is more than one processing unit, including a multiple CPU configuration found in high-performance workstations and servers, or a multiple scalable processing unit found in mainframes.

The operating system 3321 may be MICROSOFT® WINDOWS NT®/WINDOWS® 2000/WINDOWS® XP Workstation; WINDOWS NT®/WINDOWS® 2000/WINDOWS® XP Server; a variety of UNIX®-flavored operating systems, including AIX® for IBM® workstations and servers, SUNOS® for SUN® workstations and servers, LINUX® for INTEL® CPU-based workstations and servers, HP UX WORKLOAD MANAGER® for HP® workstations and servers, IRIX® for SGI® workstations and servers, VAX/VMS for Digital Equipment Corporation computers, OPENVMS® for HP ALPHASERVER®-based computers, MAC OS® X for POWERPCE based workstations and servers; SYMBIAN OS®, WINDOWS MOBILE® or WINDOWS CE®, PALM®, NOKIA® OS ("NOS"), OSE®, or EPOC® for mobile devices, or a proprietary operating system for computers or embedded systems. The application development platform or framework for the operating system 3321 may be: BINARY RUNTIME ENVIRONMENT FOR WIRELESS® ("BREW®"); Java Platform, Micro Edition ("Java ME") or Java 2 Platform, Micro Edition ("J2ME®"); PYTHON™, FLASH LITE®, or MICROSOFT®.NET Compact.

While FIGS. 32 and 33 illustrate one possible implementation of a computing device that executes program code, or program or process steps, configured to provide for an enhanced control that allows for a user to intuitively and easily enter text, numbers, or select from a plurality of items, other types of computers or implementations may also be used as well.

A number of implementations have been described. Nevertheless, it will be understood that various modifications may be made without departing from the spirit and scope of the disclosure. Accordingly, other implementations are within the scope of the following claims.

What is claimed is:

1. A computer program product, tangibly embodied in a non-transitory machine-readable medium, the computer program product comprising instructions that, when read by a machine, operate to cause data processing apparatus to:
   determine a position of an avatar in a user interface;
   dynamically define a curved guide line to surround at least a portion of the determined position of the avatar, further comprising:
      determining a range of motion of an arm of the avatar, and
      defining the guide line within the range of motion of the arm, based on the determined range of motion of the arm;
   display, without obscuring the avatar, alphanumeric characters aligned with the guide line;
   receive a cursor-based user selection of one of the displayed alphanumeric characters;
   animate the arm of the avatar based on the cursor-based user selection; and
   highlight, based on receiving the selection, the selected alphanumeric character, further comprising:
      increasing a size of the selected alphanumeric character to a first extent, and
      increasing a size of alphanumeric characters on each side of the selected alphanumeric character to a second extent less than the first extent.

2. The computer program product of claim 1, further comprising instructions for detecting an object in the user interface, wherein the guide line is dynamically defined on a side of the avatar opposite to the object.

3. The computer program product of claim 1, further comprising instructions for:
   determining a change in the determined position, and
   redefining the guide line relative to the avatar based on the determined change.

4. The method computer program product of claim 1, further including instructions for causing items to be aligned with the guide line, wherein each item comprises a symbol, a setting, or a name.

5. The computer program product of claim 1, further comprising instructions for changing a color or opacity of the selected alphanumeric character.

6. The computer program product of claim 5, wherein the instructions for changing the color or opacity of the selected alphanumeric character further comprise instructions for:
   changing the color or opacity of the selected alphanumeric character to a first degree; and
   changing the color or opacity of alphanumeric characters adjacent to the selected alphanumeric character to a second degree.

7. The computer program product of claim 1, wherein the instructions for displaying the alphanumeric characters further comprise instructions for evenly distributing the alphanumeric characters along the guide line.

8. The method computer program product of claim 1, wherein a starting point and an ending point of the guide line are aligned horizontally or vertically.

9. The computer program product of claim 1, wherein the guide line is defined along an outer edge of the range of motion of the arm of the avatar.

10. The computer program product of claim 1, further comprising instructions for: designating a first or a second potential control portion of the avatar as a control portion; animating the designated control portion; and
 swapping the control portion designation from the first potential control portion to the second potential control portion, or from the second potential control portion to the first potential control portion.

11. The computer program product of claim 1, further comprising instructions for receiving a selection of one of the unselected alphanumeric characters at a dynamically repositioned position of the unselected alphanumeric character along the guide line.

12. The computer program product of claim 1, further comprising instructions for dynamically increasing a touch region for the alphanumeric characters on each side of the selected alphanumeric character in a manner corresponding to the increase in size of the alphanumeric characters on each side of the selected alphanumeric character, the touch region being a region in an image where presence of an object is interpreted as a touch of an alphanumeric character that corresponds to the touch region.

13. A computer comprising: an interface configured to be coupled with a display; and a memory having instructions stored thereon which, when executed by the computer, cause the computer to perform operations comprising:
 determining a position of an avatar in a user interface shown on the display;
 dynamically defining a curved guide line to surround at least a portion of the determined position of the avatar, further comprising: determining a range of motion of an arm of the avatar, and
 defining the guide line within the range of motion of the arm, based on the determined range of motion of the arm; causing the display to show, without obscuring the avatar, alphanumeric characters aligned with the guide line;
 receiving a cursor-based user selection of one of the displayed alphanumeric characters;
 causing the display to animate the arm of the avatar based on the cursor-based user selection; and
 causing the display to highlight, based on receiving the selection, the selected alphanumeric character, further comprising:
  increasing a size of the selected alphanumeric character to a first extent, and
  increasing a size of alphanumeric characters on each side of the selected alphanumeric character to a second extent less than the first extent.

14. A method comprising:
 determining a position of an avatar in a user interface;
 dynamically defining a curved guide line to surround at least a portion of the determined position of the avatar, further comprising:
  determining a range of motion of an arm of the avatar, and
  defining the guide line within the range of motion of the arm, based on the determined range of motion of the arm;
 displaying, without obscuring the avatar, alphanumeric characters aligned with the guide line;
 receiving a cursor-based user selection of one of the displayed alphanumeric characters;
 animating the arm of the avatar based on the cursor-based user selection; and
 highlighting, based on receiving the selection, the selected alphanumeric character, further comprising:
  increasing a size of the selected alphanumeric character to a first extent, and
  increasing a size of alphanumeric characters on each side of the selected alphanumeric character to a second extent less than the first extent.

15. An apparatus comprising:
 a processor;
 a memory;
 means for determining a position of an avatar in a user interface; means for dynamically defining a curved guide line to surround at least a portion of the determined position of the avatar, further comprising:
 means for determining a range of motion of an arm of the avatar, and means for defining the guide line within the range of motion of the arm, based on the determined range of motion of the arm; means for displaying, without obscuring the avatar, alphanumeric characters aligned with the guide line;
 means for receiving a cursor-based user selection of one of the displayed alphanumeric characters; means for animating the arm of the avatar based on the cursor-based user selection; and
 means for highlighting, based on receiving the selection, the selected alphanumeric character, further comprising:
 means for increasing a size of the selected alphanumeric character to a first extent, and means for increasing a size of alphanumeric characters on each side of the selected alphanumeric character to a second extent less than the first extent.

* * * * *